(12) United States Patent
Finseth et al.

(10) Patent No.: US 6,754,906 B1
(45) Date of Patent: Jun. 22, 2004

(54) CATEGORICAL ELECTRONIC PROGRAM GUIDE

(75) Inventors: Craig A. Finseth, St. Paul, MN (US); Jeffrey A. Brown, Roseville, MN (US); Philip E. Hsiao, Eden Prairie, MN (US)

(73) Assignee: The Directv Group, Inc., El Segundo, CA (US)

( * ) Notice: Subject to any disclaimer, the term of this patent is extended or adjusted under 35 U.S.C. 154(b) by 0 days.

(21) Appl. No.: 09/535,235

(22) Filed: Mar. 24, 2000

Related U.S. Application Data

(60) Provisional application No. 60/126,718, filed on Mar. 29, 1999.

(51) Int. Cl.[7] ............................ G06F 3/00; G06F 13/00; H04N 5/445
(52) U.S. Cl. ............................. 725/45; 725/40; 725/58
(58) Field of Search ............................. 725/44, 45, 52, 725/39; 345/853, 854, 841, 848, 850

(56) References Cited

U.S. PATENT DOCUMENTS

| | | | | |
|---|---|---|---|---|
| 5,623,613 A | * | 4/1997 | Rowe et al. | 345/841 |
| 5,671,411 A | * | 9/1997 | Watts et al. | 725/45 |
| 5,686,954 A | | 11/1997 | Yoshinobu et al. | |
| 5,699,107 A | * | 12/1997 | Lawler et al. | 725/58 |
| 5,850,218 A | * | 12/1998 | LaJoie et al. | 725/45 |
| 5,880,768 A | | 3/1999 | Lemmons et al. | |
| 6,018,372 A | | 1/2000 | Etheredge | |
| 6,188,405 B1 | * | 2/2001 | Czerwinski et al. | 345/764 |
| 6,216,264 B1 | | 4/2001 | Maze et al. | |
| 6,236,987 B1 | * | 5/2001 | Horowitz et al. | 707/3 |
| 6,246,442 B1 | * | 6/2001 | Harada et al. | 725/44 |
| 6,266,295 B1 | | 7/2001 | Parker et al. | |
| 6,268,849 B1 | | 7/2001 | Boyer et al. | |
| 6,281,898 B1 | * | 8/2001 | Nikolovska et al. | 345/848 |
| 6,323,911 B1 | * | 11/2001 | Schein et al. | 725/56 |
| 6,452,611 B1 | * | 9/2002 | Gerba et al. | 345/721 |
| 6,473,751 B1 | * | 10/2002 | Nikolovska et al. | 345/836 |
| 6,480,210 B1 | * | 11/2002 | Martino et al. | 345/764 |
| 6,481,010 B2 | | 11/2002 | Nishikawa et al. | |
| 6,532,589 B1 | | 3/2003 | Proehl et al. | |

* cited by examiner

Primary Examiner—John Miller
Assistant Examiner—Scott Beliveau
(74) Attorney, Agent, or Firm—Georgann Grunebach; John A. Crook

(57) ABSTRACT

The invention is a device for generating a display of an electronic program guide on a screen. Invention is comprised of a receiver which includes a tuner for receiving an input stream of television content and electronic program guide data. The receiver separates the electronic program guide data from the input stream. The invention also comprises a memory coupled to the receiver for storing the electronic program guide data that has been separated from the input stream. Additionally, a display means is included for generating a display which combines a set of electronic program guide data. The program guide data includes a plurality of program titles, and a plurality of organizational categories. Each program title belongs to at least one of the organizational categories. The program titles are arranged in the display so that the program titles which belong to the same organizational categories are spatially adjacent and program titles which are not members of the same organizational categories are spatially separated. The organizational categories provide a first-level organization which defines overall content of the display. It also defines a second-level organization which defines the spatial separation of the program titles. The organizational categories are time, channel, topic and actor based, and are used at any organizational level.

25 Claims, 14 Drawing Sheets

CATEGORICAL ELECTRONIC PROGRAM GUIDE

CROSS-REFERENCE TO RELATED APPLICATIONS

This application claims the benefit of U.S. Provisional Patent Application Serial No. 60/126,718, by Craig A. Finseth, Jeffrey A. Brown, and Philip E. Hsiao, filed Mar. 29, 1999, and entitled "CATEGORICAL ELECTRONIC PROGRAM GUIDE," which application is hereby incorporated by reference herein.

This application is also related to the following co-pending and commonly assigned patent application, which is incorporated by reference herein:

Application Ser. No. 09/536,075, entitled "ELECTRONIC TELEVISION PROGRAM GUIDE WITH CALENDAR TOOL," filed on same date herewith, by Philip E. Hsiao, Jeffrey A. Brown, and Craig A. Finseth.

BACKGROUND OF THE INVENTION

1. Field of the Invention

The present invention relates to the electronic display of television program guide information on a screen. More specifically, the invention relates to a method of organizing and displaying program information in such a manner as to allow for optimal use of the area available on the television screen.

2. Description of the Related Art

Television programs are distributed to viewers by a variety of broadcasting methods. These methods include traditional analog broadcast television, the upcoming digital broadcast television, cable television (both analog and digital), satellite broadcasting (both analog and digital), as well as other methods. These methods allow channels to be multiplexed and transmitted over a common transmission medium. Since television broadcasting systems can have hundreds of channels, there must be some mechanism for informing the viewer of the content available on the various channels. Electronic television program guides have proven to be an effective means for providing this information.

Program guides for television programming are known in the art. A common method for obtaining television programming information is by consulting paper television programming guides or schedules. This method of disseminating information, however, has limitations. A paper guide may become obsolete or a schedule may change, rendering the paper copy useless. Additionally, the paper schedule may easily be lost.

Electronic program guides have been proposed to alleviate some of the limitations of paper. One example is a cable system that provides a continuous feed of guide information to a dedicated television channel. The channel displays continuous program listings. The continuous nature of the link allows the guide to be updated and reflect current scheduling information. An alternate method of providing guide content is to send it, along with program content, through satellite transmissions to receiving stations.

Previous program guides have been burdened with limitations. Prior television electronic program guides are based around the use of a scheduling grid. This grid typically involves one axis which corresponds to time and another axis which corresponds to transmission channels. At the intersection of each channel and time slot is a "cell" which typically displays the title of the program that is being shown on that channel at that time. The problem with this grid-type display format is that when the amount of channels available to the user is more than 15 to 20, it becomes necessary for the viewer to scroll further through the listings, bringing up screen after screen of possible programs and channels. Additionally, if the viewer wishes to look ahead in the schedule the viewer must scroll again to another section of the grid in order to get a complete viewing of programs being broadcast later in the day, week, etc.

The number of television channels and programming alternatives available to the consumer has been increasing dramatically. Under the current grid format, an expanding number of channels are being pushed onto a single screen. The result is that the text of the display becomes so small as to become difficult to read, or the titles and descriptions of the programs become truncated so as to provide very little information to the viewer. Due to the overwhelming amount of information and options, it is necessary to have a method of displaying and sorting all the available programming information for the television viewer in an efficient manner.

Collectively, prior electronic program guide systems are frustrating to the viewer because they do not give the viewer an aesthetically pleasing and intuitive way to view information. Adding a description of the program for each active cell in the grid, or requiring the viewer to go through a hierarchy of screens of categories has not alleviated the problem of giving the viewer an intuitive and informative method of determining what programming is available.

SUMMARY OF THE INVENTION

The present invention provides an alternative for presenting television programming information. The information is displayed in spatial arrangement utilizing categories. This can be done through a "tree" type or three dimensional type format. Using these methods, a program hierarchy is presented to the viewer, giving a categorical layout of programs and links to switch directly to described programs, or obtain additional information about programs. The programs are spatially arranged on the display and the viewer is given display choices via user-links.

The use of categories and spatial placement of programs in the electronic program guide presents the viewer with an intuitive and informative display. The viewer can make programming selections quickly and receive information about desired program choices immediately using uncomplicated navigational commands. The invention provides an electronic program guide format gives users an intuitive way to decide on a program they wish to view. Because the guide is set up using organizational categories in a spatially outlined fashion, the guide is unobtrusive and immediately understandable.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
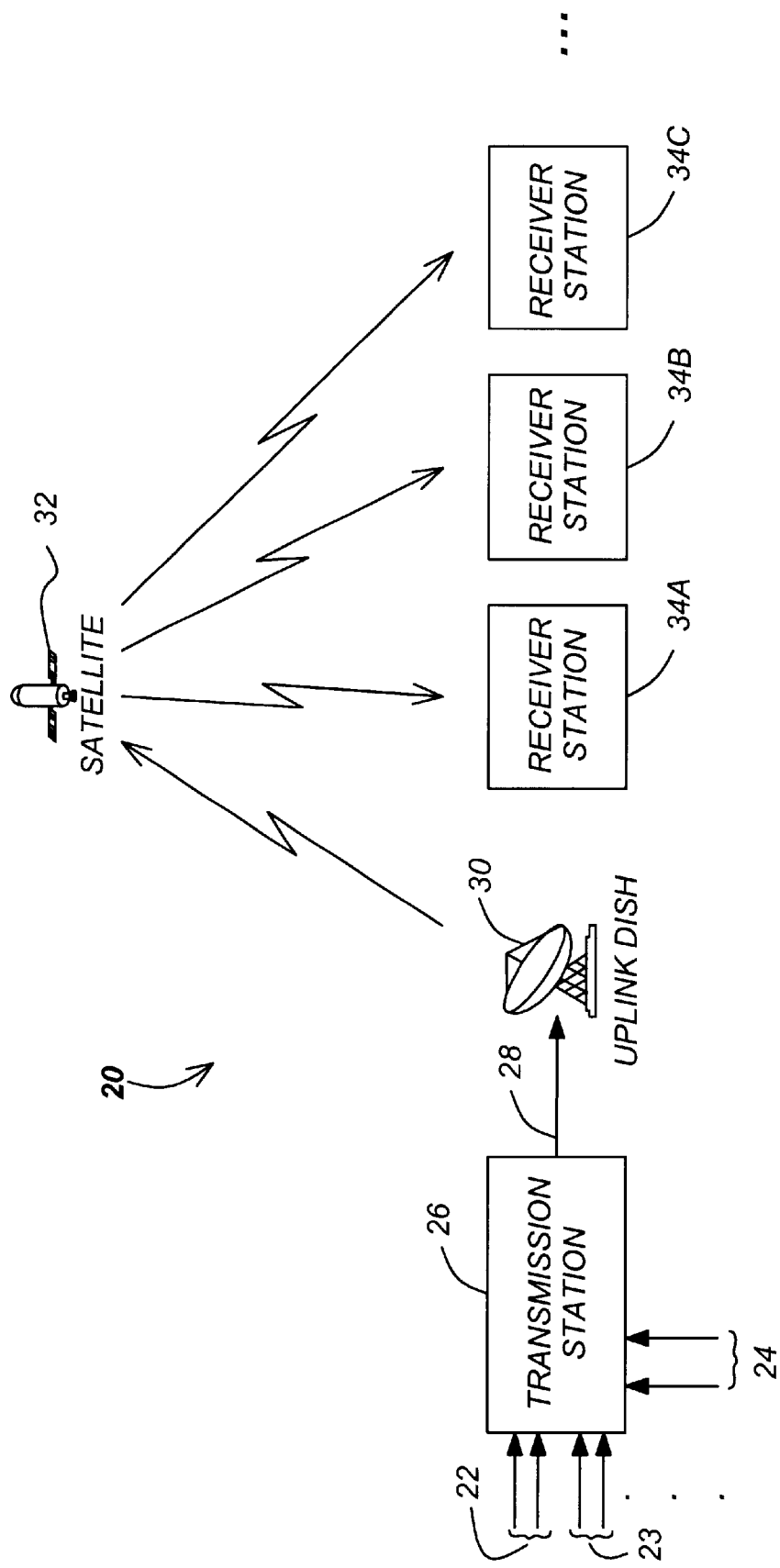
FIG. 1 is a block diagram of a television broadcasting system for the transmission, receipt and display of television content and electronic program guide data.

Delivery of Electronic Program Guide Data FIG. 1 depicts a broadcast medium suitable for delivering electronic program guide data which can be displayed in the invention format. Specifically, FIG. 1 is a block diagram of an electronic program guide data delivery system 20 which transmits and receives audio, video and data signals via satellite. Although the present electronic program guide format is described in the context of using a satellite-based television broadcasting system, the electronic program guide data can be delivered using other methods of television content delivery. Examples of other delivering methods include over-the-air systems and cable-based systems.

One method of delivering the electronic program guide is a satellite-based electronic program guide delivery system 20. This satellite based system includes transmission station 26, uplink dish 30, satellite 32, and receiver stations 34A–34C (collectively referred to as receiver stations 34). Transmission station 26 includes a plurality of input lines 22 for receiving various signals, such as analog television signals, digital television signals, video tape signals, original programming signals and computer generated signals, containing Hyper Text Markup Language (HTML) content. Additionally, input lines 23 receive signals from digital video servers having hard discs or other digital storage media. Each input line 22 typically corresponds to a single television channel. Transmission station 26 also includes a plurality of schedule feeds 24, which provide electronic schedule information about the timing, content, and transmission channels of various television programs. The electronic schedule information from schedule feeds 24 is converted into program guide data by transmission station 26.

Transmission station 26 receives and processes the various input signals received on input lines 22 and schedule feeds 24, converts the received signals into a standard form, combines the standard signals into a single output data stream 28, and continuously sends output data stream 28 to uplink dish 30. Output data stream 28 is preferably a modulated signal, which is modulated by transmission station 26 using standard frequency and polarization modulation techniques.

Uplink dish 30 continuously receives output data stream 28 from transmission station 26, amplifies the received signal and transmits the signal to satellite 32. Although a single uplink dish and satellite are shown in FIG. 1, multiple dishes and satellites are preferably used to provide additional bandwidth, and help to ensure continuous delivery of signals.

Satellite 32 revolves in geosynchronous orbit about the earth. Satellite 32 includes a plurality of transponders that receive signals transmitted by uplink dish 30, amplify the received signals, frequency shift the received signals to higher frequency bands, and then transmit the amplified frequency shifted signals back to receiver stations 34.

Receiver stations 34 receive and process the signals transmitted by satellite 32. Receiver stations 34 include hardware and software for separating the electronic program guide data from the received signals, and processing and displaying the electronic program guide data. Receiver stations 34 are described in further detail below with respect to FIG. 3.

Figure 2:
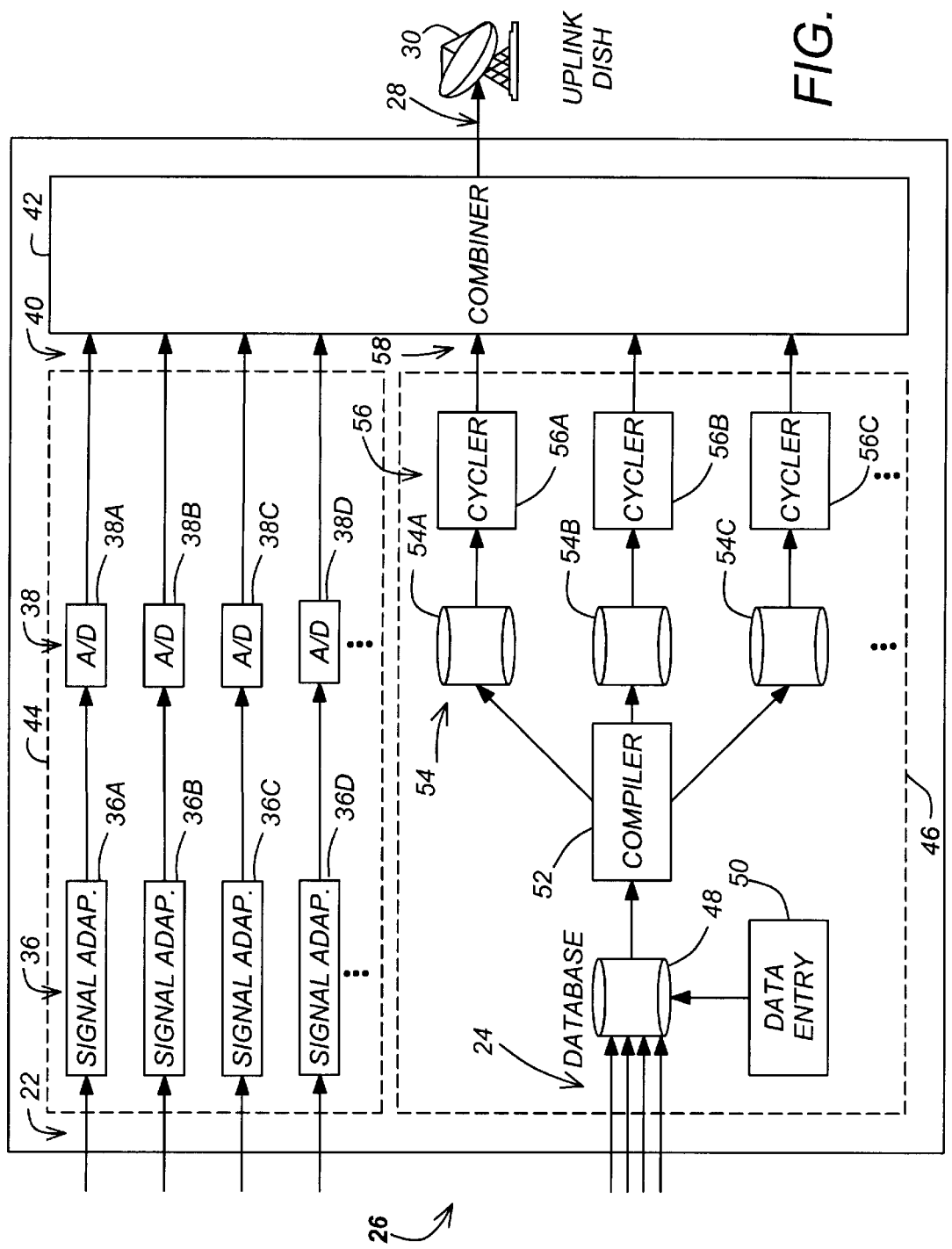
FIG. 2 is a block diagram of the transmission station of the system shown in FIG. 1.

FIG. 2 is a block diagram of one possible program transmission station 26. Transmission station 26 includes program transmitting system 44 and program guide transmitting system 46.

Program transmitting system 44 includes input signal adapters 36A–36D (collectively referred to as input signal adapters 36), analog to digital (A/D) converters 38A–38D (collectively referred to as A/D converters 38), and combiner 42. Input signal adapters 36 are coupled to A/D converters 38, and A/D converters 38 are coupled to combiner 42. Although four input signal adapters 36 and four A/D converters 38 are shown in FIG. 2, several more will typically be used in commercial systems.

Input signal adapters 36 receive input signals from input lines 22, and convert the input signals to a standard form. As mentioned above, signals from input lines 22 include analog television signals, digital television signals, video tape signals and original programming signals. Input signal adapters 36 preferably convert the input signals to a high quality analog format. The high quality analog signals are output by input signal adapters 36 to A/D converters 38. A/D converters 38 convert the analog signals received from input signal adapters 36 to digital signals, and compress the digital signals using MPEG2 encoding, although other compression schemes may be used.

During the MPEG2 encoding step, A/D converters 38 also perform a statistical multiplexing operation. During the statistical multiplexing operation, A/D converters 38 determine the amount of bandwidth that each channel will use. The amount of bandwidth allowed for each channel is determined based upon the content of the signal on that channel, and the amount of bandwidth used by other channels. For a program such as the motion picture "Independence Day", which has a very dynamic picture content with a great deal of movement and numerous bright explosions, the signal can not be compressed as much as a more static video signal like an information channel. The greater the dynamic content of the signal, the less it can be compressed and the greater the bandwidth required.

Typically, 30 Mega bits of data per second are transmitted by uplink dish 30 for each transponder in satellite 32. Each transponder receives and transmits data for about 6 channels. Thus, each channel occupies approximately 5 Mega bits of data per second, on average. During the statistical multiplexing operation, the amount of compression for each channel, and correspondingly the amount of information transmitted for each channel, is adjusted up or down depending upon the amount of available space for each transponder. Combiner 42 feeds back information to A/D converters 38 during the statistical multiplexing operation, informing A/D converters 38 of the amount of bandwidth used by various channels. A/D converters 38 then adjust the amount of compression of a signal based on the information fed back from combiner 42.

The MPEG2 encoded digital data are output by A/D converters 38 to combiner 42. Combiner 42 groups the MPEG2 encoded digital data from each A/D converter 38 into a plurality of packets, with each such packet marked with a service channel identification (SCID) number. The SCIDs are later used by receiver 64 (shown in FIG. 4) to identify the packets that correspond to each television channel. Combiner 42 combines all of the packets for all of the channels, adds error correction data, and outputs a single output data stream 28 to uplink dish 30.

Program transmitting system 44 processes audio signals in the same manner as video signals, and combiner 42 combines digital audio signals with the digital video signals. Combiner 42 also receives electronic program guide data from input lines 58 and adds that data to output data stream 28. The assembly and processing of the electronic program guide data prior to it being sent to combiner 42 is described in more detail below.

Also shown in FIG. 2 is an example of one possible program guide data transmitting system 46. Program guide data transmitting system 46 includes data entry station 50, program guide database 48, compiler 52, sub-databases 54A–54C (collectively referred to a sub-databases 54) and cyclers 56A–56C (collectively referred to as cyclers 56).

Schedule feeds 24 provide electronic schedule information about the timing, content and transmission channels and additional information of various television programs, such as that found in television schedules contained in newspapers and paper television guides. Schedule feeds 24 preferably include information from at least one company that specializes in providing schedule information, such as GNS, Tribune Media Services and T.V. Data. The data provided by companies such as GNS, Tribune Media Services and T.V. Data are typically transmitted over telephone lines as schedule feeds 24 to program guide database 48. These companies provide television schedule data for all of the television stations across the nation plus the nationwide channels, such as SHOWTIME, HBO, and the DISNEY CHANNEL. The specific format of the data that are provided by these companies varies from company to company. Additionally, program guide database 48 preferably includes schedule data for television channels across the entire nation including all nationwide channels and local channels, regardless of whether the channels are transmitted by transmission station 26.

Program guide database 48 is a computer-based system that receives schedule data from schedule feeds 24 and organizes the data into program guide data of a standard format. Compiler 52 reads the standard form program guide data out of program guide database 48, identifies common schedule portions, converts the program guide data into the proper format for transmission to users (specifically the program guide data are converted into objects as discussed below) and outputs the program guide data to one or more of sub-databases 54.

Program guide data are also entered manually into the program guide database 48 through data entry station 50. Data entry station 50 allows an operator to enter additional scheduling information, as well as combining and organizing data supplied by the scheduling companies. As with the computer organized data, the manually entered data are converted by the compiler into separate objects and sent to one or more sub-databases 54.

After compiler 52 converts the program guide data from program guide database 48 into the proper object format, compiler 52 outputs program guide objects to sub-databases 54. The program guide objects are temporarily stored in sub-databases 54 until cyclers 56 request the information. Each of cyclers 56 preferably transmits program guide objects to combiner 42 at a different rate than the other cyclers 56. For example, cycler 56A may transmit program guide objects to combiner 42 every second, while cyclers 56B and 56C may transmit program guide objects every 5 seconds and every 10 seconds, respectively.

All of the program guide objects output by the plurality of cyclers 56 are combined by combiner 42. Combiner 42 combines the program guide objects with digital video and audio data output by A/D converters 38 on input lines 40. Combiner 42 transmits output data stream 28, which includes the program guide data and the digital video and audio data, to uplink dish 30. Output data stream 28, which is output by combiner 42, is a multiplexed signal that is modulated by combiner 42 using standard frequency and polarization modulation techniques.

Since receiver 64 (shown in FIG. 3) may not always be on and receiving and saving program guide objects, the program guide objects are continuously retransmitted. Program guide objects for programs that will be shown in the next couple of hours are sent more frequently than program guide objects for programs that will be shown in 12 hours or more.

Format of Transmitted Program Guide Data

Prior to transmitting program guide data to sub-databases 54, compiler 52 organizes the program guide data from program guide database 48 into objects. Each object preferably includes an object header and an object body. The object header identifies the object type, object ID and version number of the object. The object type identifies the type of the object. The various types of objects are discussed below. The object ID uniquely identifies the particular object from other objects of the same type. The version number of an object uniquely identifies the object from other objects of the same type and object ID. The object body includes data for constructing a portion of a program guide that is ultimately displayed on a user's television.

Prior to transmission, each object is preferably broken down by compiler 52 into multiple frames. Each frame is made up of a plurality of 126 byte packets with each such packet marked with a service channel identification (SCID) number. The SCIDs are later used by receiver 64 to identify the packets that correspond to each television channel. Each frame includes a frame header, program guide data and a checksum. Each frame header includes the same information as the object header described above—object type, object ID and version number. The frame header uniquely identifies the frame, and its position within a group of frames that make up an object. The program guide data within frames are used by receiver 64 (shown in FIG. 4) to construct and display a program guide on a user's television. The checksum is examined by receiver 64 to verify the accuracy of the data within received frames.

The following is a list of preferred object types, although many additional or different object types may be used: boot object, channel list object, channel object, master schedule object, general schedule object, boot event object, general program object, time object, deletion object, HTML object, and a reserved object.

A boot object identifies the SCIDs where all other objects can be found. A boot object is always transmitted on the same channel, which means that each packet of data that makes up a boot object is marked with the same SCID number. Boot objects are transmitted frequently to ensure that receivers 64 which have been shut off, and are then turned back on, immediately receive information indicating the location of the various program guide objects. Thus, boot objects are sent from compiler 52 to a cycler 56 with a high rate of transmission.

A channel list object contains a list of all the channel objects (discussed below) in a network. A network is a grouping of all channels from a common source, such as all Digital Satellite System (DSAT) channels. For each channel object in the list of channel objects, the channel list object includes a channel object ID for that channel object. Each channel object is uniquely identified by its channel object ID.

Each channel object provides information about a particular channel. Each channel object points to a master schedule object (discussed below). Each channel object includes multiple fields or descriptors that provide information about that channel. Each descriptor includes a descriptor type ID that indicates the type of the descriptor. Descriptor types include "about" descriptors, "category" descriptors, and "reserved" descriptors. The "about" descriptor provides a description of the channel. When there is no "about" descriptor, the description defaults to a message such as "No Information Available". The "category" descriptor provides a category classification for the channel. More than one "category" descriptor can appear in the channel object if the channel falls into more than one category. "Category" descriptors preferably provide a two-tiered category classification, such as "sports/baseball" or "movie/drama", although any number of tiers may be used including single tiers. "Reserved" descriptors are saved for future improvements to the system.

A boot event object provides brief information about programs that are currently being broadcast or that will be broadcast in the near future (e.g., within the next two hours) on a particular channel. Thus, each boot event object is associated with one particular channel object, and is not shared among different channel objects. The information provided by the boot event object is not as complete as that provided by a general program object (discussed below). The function of the boot event object is to allow receiver 64 to quickly acquire program information after receiver 64 is powered up. Receiver 64 then continues acquiring complete program information in the background from general program objects. Since the purpose of boot event objects is to provide receiver 64 with immediate program information, boot event objects are transmitted by a cycler 56 that has a high rate of transmission.

A general program object provides a complete description of a program. The general program object is pointed to by other objects (namely, master schedule objects, general schedule objects, and HTML objects) that contain the starting time and duration of the program. Like channel objects, descriptors are used within general program objects. General program objects use the same types of descriptors as channel objects. Category descriptors provide a category classification for a program and "about" descriptors provide a description of the program. If compiler 52 determines that a particular program is scheduled to appear on multiple channels, the general program object for that program is transmitted a single time for the multiple channels, although, as discussed above, it may be retransmitted multiple times.

A general schedule object points to a group of general program objects. A general schedule object is assigned a time duration by a master schedule object (discussed below). Each general schedule object identifies all of the general program objects that must be acquired for the assigned time duration. Each general schedule object is uniquely identified by a schedule object ID. A unique general schedule object may be pointed to by more than one master schedule object. As time progresses and the scheduling information becomes stale, the general schedule object is no longer needed. General schedule objects that are not referenced by any master schedule object are discarded by receiver 64.

A master schedule object contains the start time of the entire schedule, as well as the start time and duration of the general schedule objects and general program objects. A master schedule object points to general program objects and general schedule objects. The start time of the first general schedule object is given by the schedule start time. The start time of the next general schedule object is the time the previous general schedule object ends. As time progresses and the scheduling information becomes stale, a new master schedule object replaces the previous version, and updates the scheduling information. Thus, the channel object pointing to the master schedule object need not be updated. Only the master schedule object is updated.

A time object provides the current time of day and date at transmission station 26. Time objects include format codes that indicate which part of the date and time is to be displayed. For example, the only part of the date of interest might be the year. Similarly, whenever dates and times are transmitted within an object, the dates and times are accompanied by format codes. The format codes instruct receiver 64 which portion of the transmitted date and time to display.

A deletion object provides a list of object IDs that receiver 64 must discard.

HTML objects provide additional program guide information. Guide information that has been organized and manually entered by operators is converted into HTML objects. HTML objects can be comprised of text, image files in various formats such as GIF and JPEG, and video files in various formats such as QUICKTIME and MPEG.

HTML objects can be referenced by other HTML objects. For example, a GIF image can be used as an illustration in an HTML text block by referencing the GIF image HTML object from the text HTML object. Additionally, HTML objects can contain instructions that typically indicate that certain text should be highlighted and that point at other program guide objects. These referenced instructions are called "hyper-links." The highlighted text associated with a set of nested hyper-link instructions is ultimately displayed on a user's screen, and the displayed text is also referred to as a "hyper-link." Hyper-links that are displayed on a user's screen are selectable by a user navigating around the electronic program guide using a device such as remote control 86. When a hyper-link is selected, data from HTML objects that are pointed to by the hyper-link are displayed.

Reserved objects are saved for future improvements to the program guide system. When a new type of object is defined, all objects of that new type will include an object header with a reserved object type.

A name system object defines a name system. Each name system object is uniquely identified by a name system object ID. A name system is essentially a table of data that assigns an entry ID for each entry in the table. For example, a name system might be used for program credits. For such a name system, the table would look something like that which illustrated in Table 1, below:

TABLE 1

Credits Name System (Name System Object ID # 1)

| Entry | Entry ID # |
|---|---|
| "Actor" | 10 |
| "Director" | 11 |
| "Producer" | 12 |
| "Role" | 13 |

Other name systems include Program Information (e.g., "Title", "Description", "Year of Production", etc.), Languages (e.g., "English", "Spanish", "French", etc.), and Lengths (e.g., "Short", "Medium", "Long", etc.). Name systems are used for any sets of data that are used frequently by receiver 64. The use of name systems reduces transmission bandwidth since frequently used data can be transmitted once, and then referred to later by codes (i.e., Name System Object ID and Entry ID).

Name system objects also occasionally include matching instructions. The matching instructions associate two or more entries within a name system, or associate one or more entries from one name system with one or more entries from a second name system. For example, the Credits Name System described above could include matching instructions to match the "Actor" entry with the "Role" entry as shown in Table 2 below:

TABLE 2

Credits Name System (ID # 1)

| Entry | Entry ID # | Matching Instructions |
|---|---|---|
| "Actor" | 10 | Use Credits Name System, Entry 13 |
| "Director" | 11 | |
| "Producer" | 12 | |
| "Role" | 13 | |

If the following two name descriptors are transmitted:
(1) "Harrison Ford" [Name System Object ID for "Credits" name system, Entry ID for "Actor"]
(2) "Indiana Jones" [Name System Object ID for "Credits" name system, Entry ID for "Role"]

Receiver 64 will note the matching instructions when it accesses the Credits Name System Table, and will automatically match the two data elements "Indiana Jones: Harrison Ford".

Receipt and Processing of Program Guide Data

Figure 3:
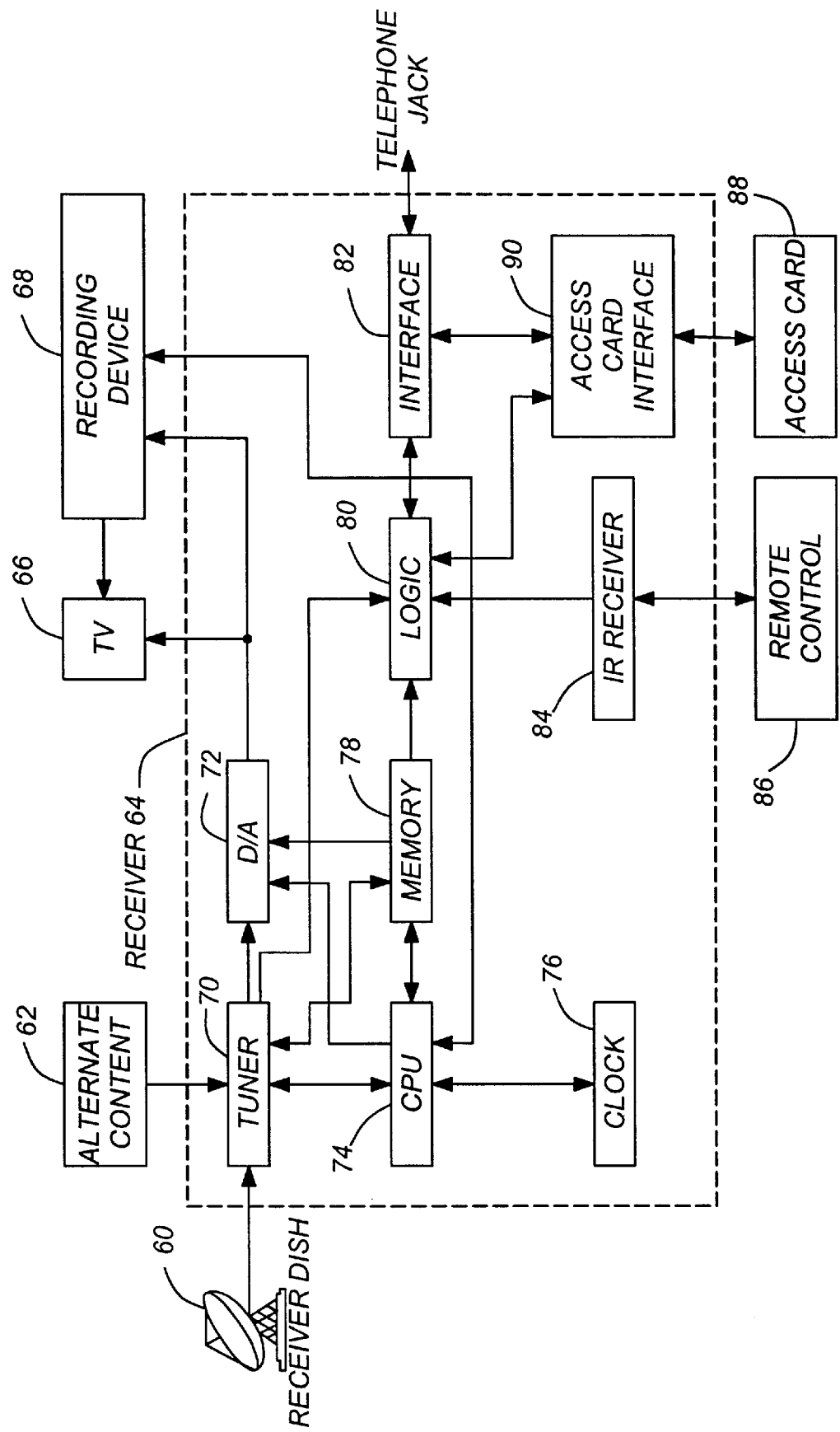
FIG. 3 is a block diagram of a receiver station for receiving and decoding audio, video and data signals.

FIG. 3 is a block diagram of one of receiver stations 34 which receives and decodes audio, video and data signals. Receiver station 34 includes receiver dish 60, receiver 64, television 66, recording device 68 and remote control 86. Receiver 64 includes tuner 70, digital-to-analog (D/A) converter 72, CPU 74, clock 76, memory 78, logic circuit 80, interface 82, and infrared (IR) receiver 84.

Although this embodiment shows a receiving station located at the television, this is not the only acceptable embodiment. The electronic program guide may be assembled and generated at the transmitting site, then transmitted as analog or digital signals over distance to the displaying device. Alternatively, the receiver may be combined with, or be a part of the displaying device. Thus, the transmitting, receiving, and displaying system described herein is but one embodiment of the invention. Other embodiments exist, one example being a computer with a monitor coupled to a network.

Receiver dish 60 receives signals sent by satellite 32, amplifies the signals and passes the signals on to tuner 70. Tuner 70 operates under control of CPU 74. The functions performed by CPU 74 are controlled by a control program stored in memory 78. Memory 78 also stores a parameter table, which includes a variety of parameters for receiver 64 such as a list of channels receiver 64 is authorized to process and generate displays for, the zip code and area code for the area in which receiver 64 is used, and the model number of receiver 64. Clock 76 provides the current local time to CPU 74. Interface 82 is preferably coupled to a telephone jack at the site of receiver station 34. Interface 82 allows receiver 64 to communicate with transmission station 26 via telephone lines. Interface 82 may also be used to transfer data to and from a network, such as the Internet.

The CPU 74 operates under control of an operating system stored in the memory 78 or within an auxiliary memory within the CPU 74. The functions performed by CPU 74 are controlled by one or more control programs or applications stored in memory 78. Operating system and applications are comprised of instructions which, when read and executed by the CPU 74, cause the receiver 64 to perform the functions and steps necessary to implement and/or use the present invention, typically, by accessing and manipulating data stored in the memory 78. Instructions implementing such applications are tangibly embodied in a computer-readable medium, such as the memory 78 or the access card 88. The CPU 74 may also communicate with other devices through interface 82 or the receiver dish 60 to accept commands or instructions to be stored in the memory 78, thereby making a computer program product or article of manufacture according to the invention. As such, the terms "article of manufacture," "program storage device" and "computer program product" as used herein are intended to encompass any application accessible by the CPU 74 from any computer readable device or media.

Memory 78 and access card 88 store a variety of parameters for receiver 64, such as a list of channels receiver 64 is authorized to process and generate displays for; the zip code and area code for the area in which receiver 64 is used; the model name or number of receiver 64; a serial number of receiver 64; a serial number of access card 88; the name, address and phone number of the owner of receiver 64; and the name of the manufacturer of receiver 64.

Access card 88 is removable from receiver 64 (as shown in FIG. 3). When inserted into receiver 64, access card 88 is coupled to access card interface 90, which communicates via interface 82 to a customer service center (not pictured). Access card 88 receives access authorization information from the customer service center based on a user's particular account information. In addition, access card 88 and the customer service center communicate regarding billing and ordering of services.

Clock 76 provides the current local time to CPU 74. Interface 82 is preferably coupled to a telephone jack at the site of receiver station 34. Interface 82 allows receiver 64 to communicate with transmission station 26 via telephone lines. Interface 82 may also be used to transfer data to and from a network, such as the Internet.

The signals sent from receiver dish 60 to tuner 70 are digital signals that are grouped into a plurality of packets. Each packet includes a header that identifies the SCID number for the packet, and the type of data contained in the packet (e.g., audio data, video data, or program guide data). Tuner 70 includes multiple output lines for transmitting video data, audio data, and program guide data. As packets are received from receiver dish 60, tuner 70 identifies the type of each packet. If tuner 70 identifies a packet as program guide data, tuner 70 outputs the packet to memory 78. Program guide data is stored in a guide database in memory 78.

Initially, as data enter receiver 64, tuner 70 looks for a boot object. Boot objects are always transmitted with the same SCID number, so tuner 70 knows that it must look for packets marked with that identification number. A boot object identifies the identification numbers where all other program guide objects can be found. The information from the boot object is used by tuner 70 to identify packets of program guide data and route them to memory 78.

As program guide data is received and stored in the guide database in memory 78, CPU 74 acts as a control device and performs various operations on the data in preparation for displaying a program guide on television 66. These operations include packet assembly, object assembly and object processing.

The first operation performed on the program guide data stored in the guide database in memory 78 is packet assembly. During the packet assembly operation, CPU 74 examines the stored program guide data and determines the locations of the packet boundaries.

The next step performed by CPU 74 is object assembly. During the object assembly step, CPU 74 combines packets to create object frames, and then combines the object frames to create program guide objects. CPU 74 examines the checksum transmitted within each object frame, and verifies whether the frame data was accurately received. If the object frame was not accurately received, it is discarded from memory 78. Also during the object assembly step, receiver 64 discards assembled objects that are of an object type that receiver 64 does not recognize. Receiver 64 maintains a list of known object types in memory 78. CPU 74 examines the object header of each received object to determine the object type. CPU 74 compares the object type of each received object to the list of known object types stored in memory 78. If the object type of an object is not found in the list of known object types, the object is discarded from memory 78. Similarly, receiver 64 maintains a list of known descriptor types in memory 78, and discards any received descriptors that are of a type not in the list of known descriptor types.

The last step performed by CPU 74 on received program guide data is object processing. During the object processing step, the objects stored in the guide memory 78 are combined to create a digital image of a program guide. Instructions within the objects direct CPU 74 to incorporate other objects or create accessible user-links. The digital image of the electronic program guide is later converted to an analog signal that is sent by the receiver 64 to television 66 for display to a user. Television 66 may alternatively be a digital television, in which case a digital to analog conversion would not be necessary.

When a user requests the display of a program guide by pressing a "guide" button on remote control 86, a guide request signal is received by IR receiver 84 (shown in FIG. 4) and transmitted to logic circuit 80. Logic circuit 80 informs CPU 74 of the guide request. In response to the guide request, CPU 74 causes memory 78 to transfer the program guide digital image to D/A converter 72. D/A converter 72 converts the program guide digital image into a standard analog television signal, which is then transmitted to television 66. Television 66 then displays the program guide.

Users interact with the electronic program guide using remote control 86. Examples of user interactions include selecting a particular channel or requesting additional guide information. Remote control 86 emits infrared signals that are received by infrared (IR) receiver 84 in receiver 64. Other types of data entry devices may alternatively be used, such as an ultra-high frequency (UHF) remote control, a keypad on receiver 64, a remote keyboard and a remote mouse. When a user selects a channel using remote control 86, IR receiver 84 relays the user's selection to logic circuit 80, which then passes the selection on to memory 78 where it is accessed by CPU 74. CPU 74 instructs tuner 70 to output the audio and video packets for the selected channel to D/A converter 72. D/A converter 72 converts the packets to analog signals, and outputs the analog signals to television 66.

Categorical Guide Format

Receiver 64 combines objects stored in memory 78 in a manner that creates an electronic program guide. CPU 74 examines the objects stored in memory 78 to determine which program objects will be displayed on the television 66 as the electronic program guide. The receiver 64 has a pre-set template for the electronic program guide which may be altered through various methods, including operational menus discussed in FIGS. 9 and 10. The receiver 64 uses organizational categories and structures to determine which program objects will be used to fill in areas in the template stored in the receiver 64. This use of sorting and of the specific arrangement of objects is particular to this invention.

The invention electronic program guide informs the user of upcoming programming by grouping similar programs together. This allows the user to eliminate excess programming information which he or she is not interested in, displaying only programming which fits his or her preferences. A difference between prior art guides and the invention guide is that the invention guide separates and organizes program information using organizational categories, and then spatially groups the program information in an outline format. The user can subsequently access more detailed program information when he or she finds information which interests him or her.

The invention electronic program guide displays program information which falls under a broad organizational category and then further organizes the information by using sub-categories. The information can further be organized by using more levels of sub-categories. This organizational structure can continue to any level of detail. The information is then displayed to the user by spatially arranging the organizational topics and/or the program information so that pieces of program information which belong to the same organizational categories are displayed close together while other pieces of program information which are not in the same organizational category are spatially separated on the display.

Figure 4:
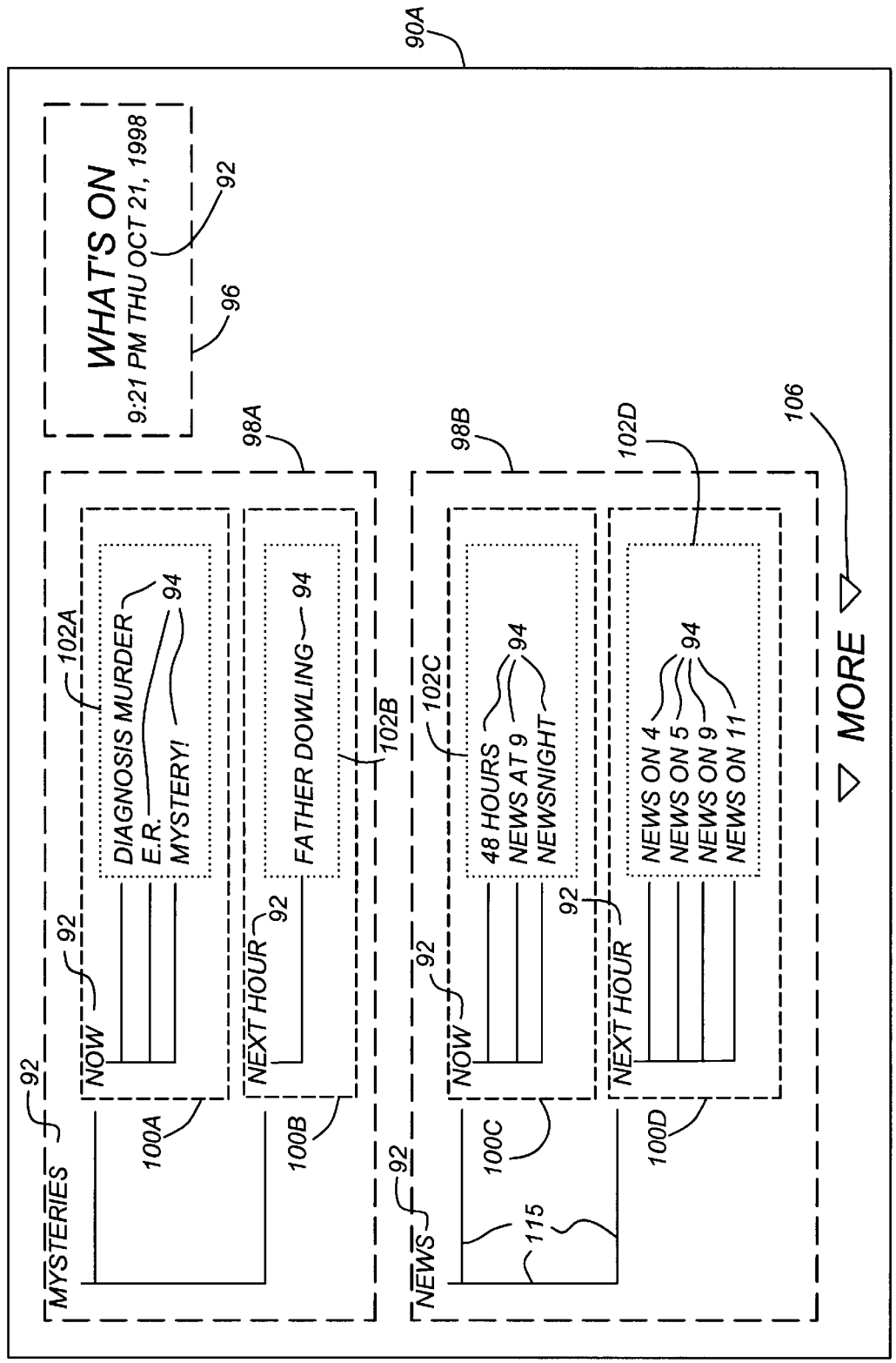
FIG. 4 shows a preferred embodiment of the invention using time and topical subjects as organizational categories and displayed in a tree style format.

FIG. 4 depicts a preferred embodiment of the invention using a "tree organization" embodiment of the electronic program guide 90A as generated by receiver 64. Tree organization electronic program guide 90A includes organizational categories 92 graphical indicia 115 and program titles 94. Organizational categories 92 are located in a first region 96, second regions 98A–98B and third regions 100A–100D. Program titles 94 are displayed in the program title region 102A–102D. Regions are indicated in FIGS. 4–8 by dotted lines. Those dotted lines are for the purposes of this description, and are not actually displayed on the screen. Note that in the following description of FIGS. 4–8, specific examples of program guide elements such as second region 98A and third region 100A are referred to with a reference number that includes an appended letter, in this case the letter "A". On the other hand, when program guide elements are referred to generally, no letter is appended (e.g., first region 96, which refers collectively to all of the first regions which appear in the invention embodiment).

The organization of the invention electronic program guide is conveyed spatially. Any number of organizational categories can be used, including those based on time, actor, topical subjects, and channel. Here, the overall organization for the guide is shown in first region 96 as "9:21 p.m. Thu Oct. 21, 1998." Therefore, the first level, or overall organization of the electronic program guide 90A includes all program titles 94 which are associated with the time-based organizational category 92 specified in the first region 96. In this embodiment, the first-level organization includes all programming which occurs on a particular day, specifically Thursday, Oct. 21, 1998.

The second-level of organization is shown in the second regions 98A and 98B as the organizational categories 92, "Mysteries" and "News." Program titles 94 which are associated with topical subjects "Mysteries" and "News" are separated from the larger group of program titles 94 associated with the first-level organizational category 92, "Thursday, Oct. 21, 1998." Although only two topical subjects are shown (Mysteries and News), any topical subject may be used as an organizational category 92. For example, a short and non-exclusive list of topical subjects which can be used as organizational categories 92 would include: sports, movies, comedy, action, religion, music, science and history.

The third-level organization of the electronic program guide 90A is shown in the second regions 100A–100D as the organizational categories 92, "Now" and "Next Hour." These time-based organizational categories are used to separate program titles from the larger group of program titles associated with the first two organizational levels. In this embodiment, program titles 94 currently being broadcast and program titles 94 that will be broadcast in the next hour (at 10:00 p.m.) are separated from all mysteries and news programs televised on Thursday, Oct. 21, 1998. The final result of sorting and separating program titles 94, using the organizational categories 92, leaves all program titles 94 transmitted on Thursday, Oct. 21, 1998, which are mysteries or news programs, and are being transmitted now or next hour (at 10:00 p.m.). This group of program titles 94 is displayed in the program title regions 102A–102D. Each program title 94 is located spatially adjacent to other program titles 94 which are members of the same organizational categories 92. This "grouping" is shown in the area defined by the program title region 102.

Each program title 94 is assigned to at least one organizational category 92. The assignment of program titles 94 to organizational categories 92 is provided by the scheduling companies, or manually entered at the site of the program guide database 48. The association of each program title 94 to categories allows the CPU 74 to organize the electronic program guide 90 according to a category or sub-category. The organizational structure of the electronic program guide 90 can be pre-set in the receiver 64 as well as created by the user. Instructions on creating the structure are contained in a software control program stored in memory 78. These instructions specify a series of topical subjects, time frames, actors and transmission channels to be used as organizational categories 92 for first, second and third-level organization. Other organizational categories 92 not listed here may also be used to create the electronic program guide 90. In addition, although the embodiments discussed only show organization up to a third-level, any number of levels of organization can be used. When more levels of organization are used, the overall organization becomes more refined, resulting in less program titles 94 having common organizational categories.

The user can choose the organizational structure he or she wishes to have displayed as the electronic program guide 90. Choosing which embodiment of the invention electronic program guide 90 is to be used can be done in a variety of ways. One method is through use of an operating menu, which will be discussed later with respect to FIGS. 9–11. Further, a user may choose his or her own set of organizational categories 92 and the organizational levels where they are to be used. A selection in an operating menu allows users to choose organizational categories 92 for a number of levels (first, second, third etc.), which gives users the option of personalizing the electronic program guide to show program titles that they would be most interested in. Once the selection is made, the newly created embodiment of the electronic program guide 90 can be saved in the memory 78 of the receiver 64.

A connection between certain organizational categories 92 (shown in FIG. 5) is indicated by a series of line connectors 104. Although the spatial placement of the organizational categories 92 next to the program titles 94A indicate this connection, the line connectors 104 produce a visual effect which helps to indicate to the user what series of organizational categories 92 each program title 94 belongs to. Additionally, color coding may be used to achieve the same result. Different organizational paths can be assigned different colors. For example, in FIG. 4, the second-level organization using the topical subject of "Mysteries" can be indicated using the color green, and news can be indicated using the color yellow. The third-level organization which distinguishes between mysteries and news programs being shown now and next hour can be indicated using different shades of green and yellow. Thus, under "Mysteries", all the program titles associated with "Now" are shaded dark green, and all the program titles associated with "Next Hour" are shaded light green. Using a color coding system can also allow the elimination of displaying the organizational categories 92 in a text format. For instance, an alternative embodiment of FIGS. 4 & 5 eliminates the second regions 98A–98F and the third regions 100A–100I as well as line connectors 108. Different shades of organizational colors are used to represent organizational categories 92. By presenting the user with the key to the color coding scheme, the user is able to associate the program titles 94 to organizational categories 92 by using the spatial grouping of the program titles 94 in the program title regions 102A–102I, and by using the organizational colors. This type of embodiment, where the text name of the organizational categories 92 is not displayed, is further discussed with respect to FIG. 8.

A scrolling pointer 106 is located at the bottom of the display shown in FIG. 4. Pointer 106 indicates to the user that more information exists than can fit on the display area of television 66. Using remote control 86, the user can scroll down to display more program titles 94.

Figure 5:
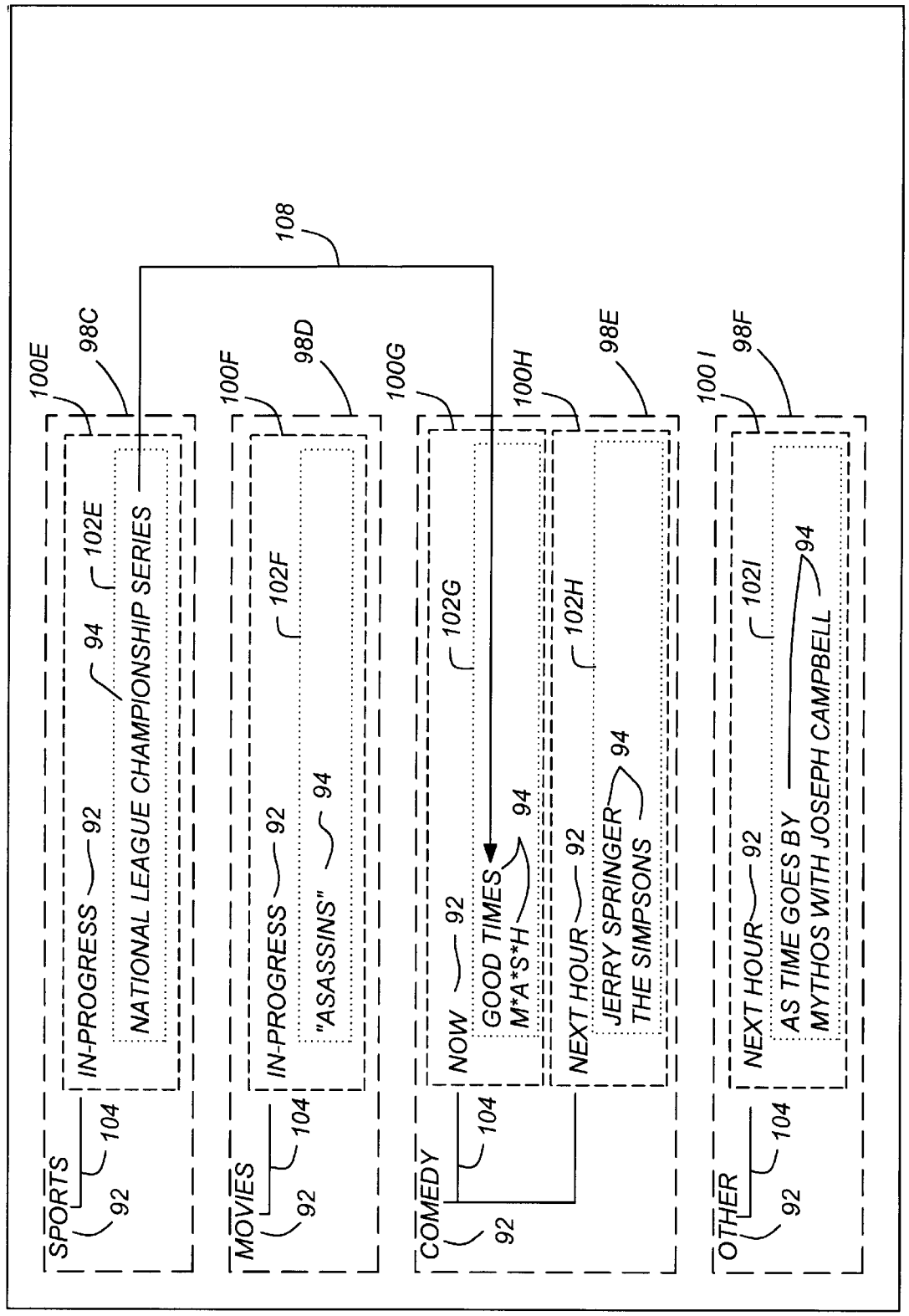
FIG. 5 shows a continuation of the embodiment shown in FIG. 4.

FIG. 5 shows a continuation of the display shown in FIG. 4 after the user has scrolled down. The organizational categories 92 used in second regions 98C–98F are the topical subjects 92, "Sports", "Movies", "Comedy" and "Other." Any program titles 94 which fit under the first or overall organizational category 92 displayed in the first region 96 (of FIG. 4), but do not fit into any specific topical subjects in the second regions 98A–98E, are lumped into a general topical subject organizational category 92, displayed in the second region 98F as "other." "In progress" is used as a third-level organizational category 92 in third regions 100E–100F. This category is another example of a time based organizational category 92. "In progress" is used to separate program titles 94 which are currently being televised and extend into the next hour of programming from program titles 94 which are currently being televised and are scheduled to end before the next hour of programming begins. An alternate programming link 108 is shown connecting the two program titles 94, "National League Championship Series" and "Good Times." This alternate programming link 108 is one method of graphically indicating when one of two programs may be transmitted at a particular time. Here, if the program "National League Championship Series" ends early, the program "Good Times" will be transmitted in its place.

Figure 6:
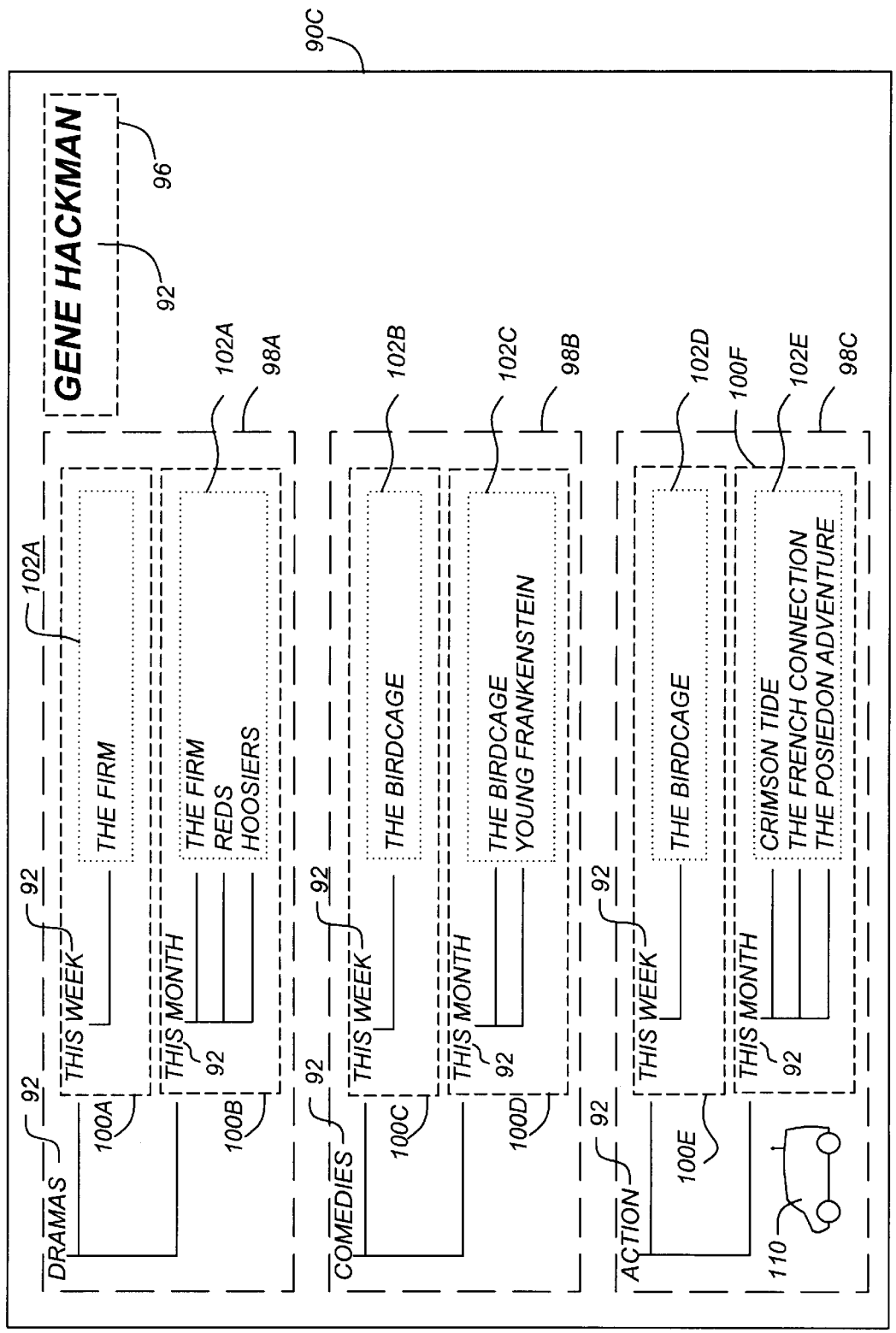
FIG. 6 shows a preferred embodiment of the invention using an actor, topical subjects and time as organizational categories and displayed in a tree style format.

Any category or combination of categories may be used to organize the electronic program guide. An embodiment of the electronic program guide 90C using alternate organizational categories is shown in FIG. 6. Here, the organizational category 92, used as the first-level organization, is Gene Hackman (an actor) shown in first region 96. The second-level organization uses the topical subjects "Dramas", "Comedies" and "Action" as organizational categories 92. The second-level categories are located in the second regions 98A–98C. Third-level organization uses time based organizational categories 92, "This Week" and "This Month" shown in third regions 100A–100F. The organizational categories 92 used in the third regions 100 for this embodiment are not mutually exclusive. Here, one organizational category 92 "This Week" shown in third-level regions 100A, 100C and 100E is fully contained in the other third-level organizational category 92 "This Month" shown in third-level regions 100, 100D and 100F, illustrating the flexibility of the invention electronic program guide 90C. It is not necessary to only display program titles 94 in relation to one organizational category. Program titles 94 can and do overlap categories as shown by the program titles 94 which are found in more than one program title region 102 in this embodiment (i.e. The Firm, The Birdcage, Crimson Tide).

Pictorial representations 110 can be interspersed as shown in FIG. 6. These may be user-links (described with respect to FIG. 8B) or may simply serve to illustrate the display. Pictorial representations 110 can be still pictures or icons. Alternatively, pictorial representations 110 can be video clips which roll when requested by the user, or run continuously.

The spatial relation of the regions in the display where the organizational categories 92 and the program titles 94 are placed can also be varied. First region 96, containing the title of the program guide, need not necessarily be placed at the top of the display. Additionally, second regions 98, third regions 100 and program title regions 102 may be placed in any spatial relationship to each other, not necessarily from left to right on the screen. Any arrangement which intuitively conveys the organization of the electronic program guide 90 can be used.

Figure 7:
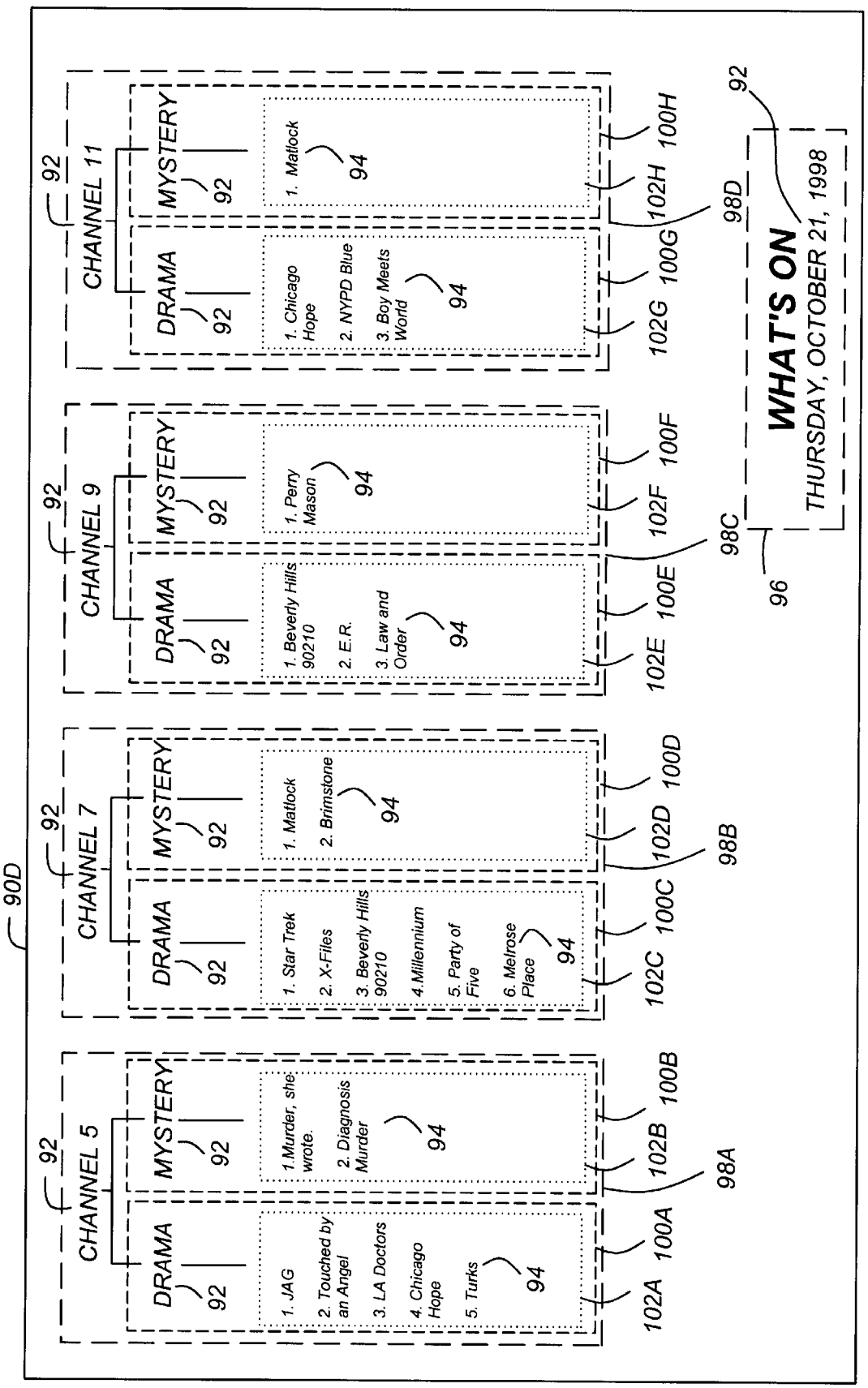
FIG. 7 shows a preferred embodiment of the invention using time, channel and topical subjects as organizational categories and displayed in a tree style format.

As shown in FIG. 7, the organizational regions 96, 98, 100 and program title regions 102 are arranged vertically in the electronic program guide 90D, compared to the horizontal arrangement used in FIGS. 4–6. Here, the first region 96, showing the overall organization is placed near the bottom of the display. The second regions 98 and third regions 100 are then arranged from the top to the bottom of the display. This arrangement allows the flow of organization to be communicated intuitively to the user. Locating the organizational category 92 Thursday, Oct. 21, 1998 in the title region 96 at the bottom of the display still effectively conveys the title of the electronic program guide 90D. The title of the display is intuitively the broadest organizational category 92 of the program titles 94 displayed. Organizing the remaining categories from top to bottom of the electronic program guide 90D is intuitive to the user as well, since people are accustomed to reading from top to bottom.

An example of using channels as an organizational level is also shown in FIG. 7. The second-level organization uses various channels as organizational categories 92 in second regions 98A–98D. The electronic program guide 90D communicates to the user the program titles 94 which are being televised on channels "5", "7", "9" and "11 " on "Thursday, Oct. 21, 1998." The program titles are further sorted and organized by the organizational categories 92 shown in the third regions 100–100H, where the topical subjects of "Drama" and "Mystery" are used as organizational categories 92.

Figure 8A:
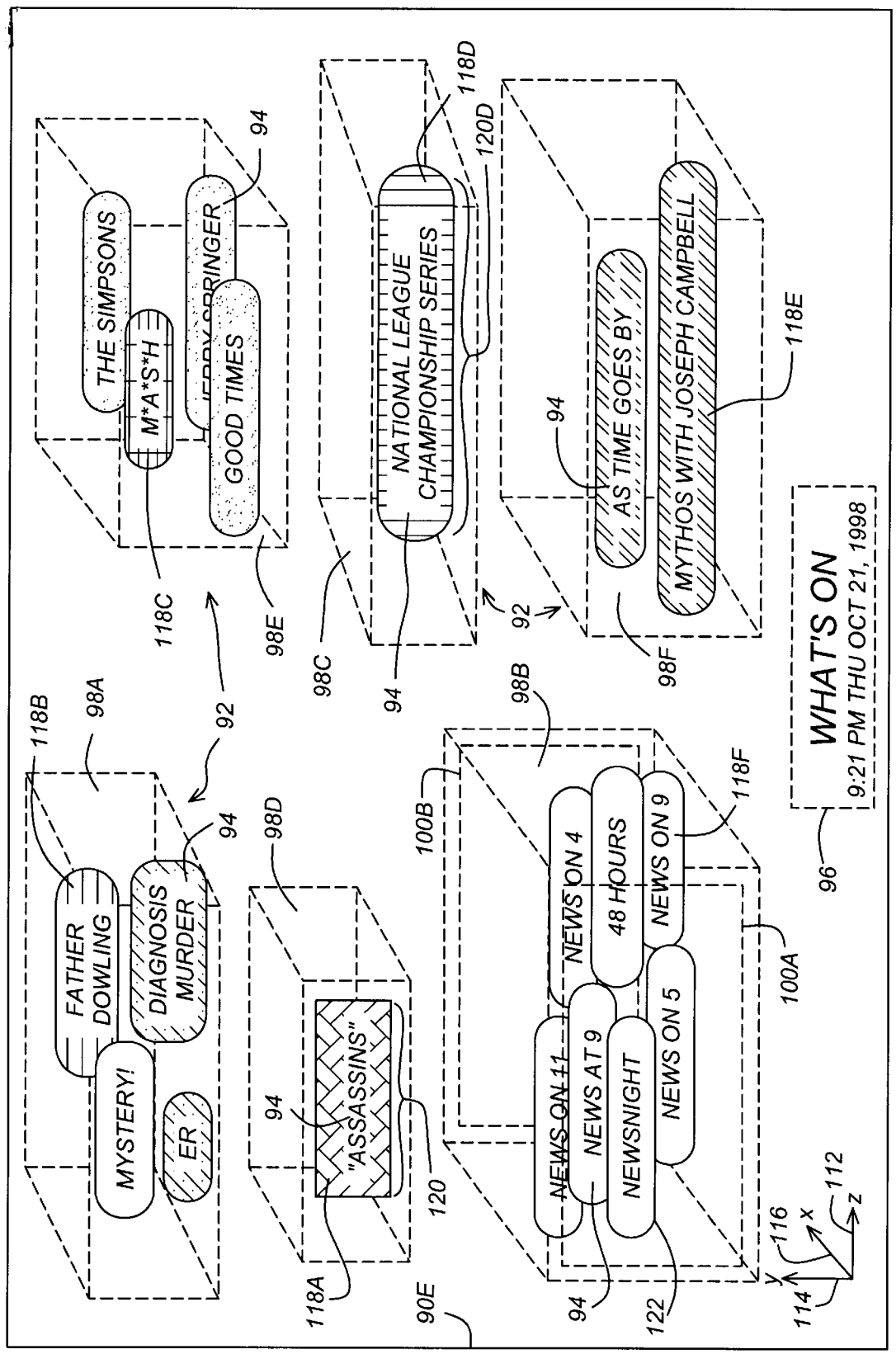
FIG. 8A shows a preferred embodiment of the invention using time and topical subjects as organizational categories and displayed in a three dimensional format.

An alternate embodiment of the invention electronic program guide 90E is shown in FIG. 8A. Electronic program guide 90E uses three dimensional space to arrange the program titles 94 and organizational categories 92. In this embodiment, the text indicating organizational categories 92 is eliminated, along with line connectors 104. By spatially arranging related program titles 94 in close proximity, the organizational levels are intuitively indicated. The regions used to indicate organization are spatially arranged along x-y-z axes. In other words, the electronic program guide 90E is placed three-dimensionally in space. The first-level of organization is shown in guide title region 96. Once again, this guide title region 96 intuitively communicates the broadest level of organization for the electronic program guide 90E. The second-level of organization is shown in second regions 98A–98F, which appear as 3-dimensional boxes (as stated previously, regions are indicated by dotted lines and are not actually displayed on the screen). The third-level organization is shown in the third regions 100A and 100B, which appear as parallel planes within second region. In order to better illustrate this embodiment of the invention electronic program guide 90E the dotted lines indicating third regions 100 have been omitted with the exception of second region 98F. Third regions 100 are further discussed in FIG. 8B.

Instead of using the words "Mystery" or "News" with a network of lines to indicate to the user which organizational category 92 is being used for the second-level organization, the second regions 98 are spatially separated in a plane created along an x-axis 112 and a y-axis 114 of the display. The third-level organization occurs by spatially separating the program titles 94 in three-dimensional space along a z-axis 116 of the display. The separation of program titles 94 along the z-axis 116 has the effect of placing some program titles 94 behind other program titles 94. Therefore, the time based organizational categories "Now" and "Next Hour", which are shown textually in FIG. 4, are illustrated in FIG.

8A by placing the program titles 94 which are playing "now" proximate to the screen in third region 100A, and those that are playing "Next Hour" deeper in the display in third region 100B, distal from the screen along the z-axis 116. Again, this is an intuitive way of communicating to the user when programs will be transmitted. Those programs further away spatially from the user are further away in time. The z-axis 116 in this embodiment represents time.

Other methods may be used in conjunction with spatial separation to emphasize the different organizational categories 92. In the current embodiment, different cross-hatching or background patterns 118A–118F are used to further distinguish the second-level organizational categories 92. Additionally, the "in progress" time category can be represented by the background pattern 118 using fading 120, which tells the user that the program title 94 is partially finished with transmission. This is accomplished by deleting a portion of background pattern 118. Colors may be used in conjunction with or in place of background patterns 118 to create the same effect of distinguishing organizational categories 92. Additionally, text boxes using different shapes may also be used.

To describe the spatial separation of the categories in FIG. 8A, the regions 98A–98F have been labeled in a clockwise fashion, beginning with the middle region on the left side of FIG. 8A. The second-level category "Movies" is used as the organizational category 92 which defines second region 98A. The program title is placed proximate to the screen, indicating the program is being transmitted "Now." The time of transmission of the program title 94 is further communicated by the background pattern 118A. The background pattern 118A uses fading 120A which indicates to the user that the program is currently in progress.

The second-level category "Mysteries" is used as the organizational category 92 which defines second region 98B. Here, three program titles 94 are proximate to the screen, indicating the programs are being transmitted earlier than the program "Father Dowling" placed deeper into the display. The background pattern 118B also serves to indicate programs which are grouped together as part of a second-level category. The programs placed closer to the screen utilize lighter shading for the background pattern 118B than those placed deeper in the screen, serving to communicate the separation of the programs transmitted now from those that will be transmitted in the future.

The second-level category "Comedy" is used as the organizational category 92 which defines second region 98C. Once again background pattern 118C is used to further distinguish the spatial separation of the second-level categories. Additionally, programs transmitted earlier and these transmitted later are distinguished by lighter and darker shading of the background pattern 118C.

The second-level category "Sports" is used as the organizational category 92 defining second region 98D. Similar to second region 98A, the background pattern 118D is used to indicate that the program is "in progress", not only by positioning the program title proximate to the screen on the display, but also by fading 120D.

Any program titles 94 which do not fit into a specific category are placed in the second region 98E designated "Other." Both these program titles 94 have the same background pattern 118E to show the membership to the same second-level category, shaded the same to show that they will be transmitted at the same time.

Finally, the second-level category "News" is placed in second region 98F. To illustrate the spatial separation along the z-axis 116 of the third-level organization, third regions 100A and 100B have been indicated with a dotted line. The third regions 100A and 100B clearly indicate the two planes (which designate a transmission time of "Now" and "Next Hour") where the program titles 94 are positioned.

Figure 8B:
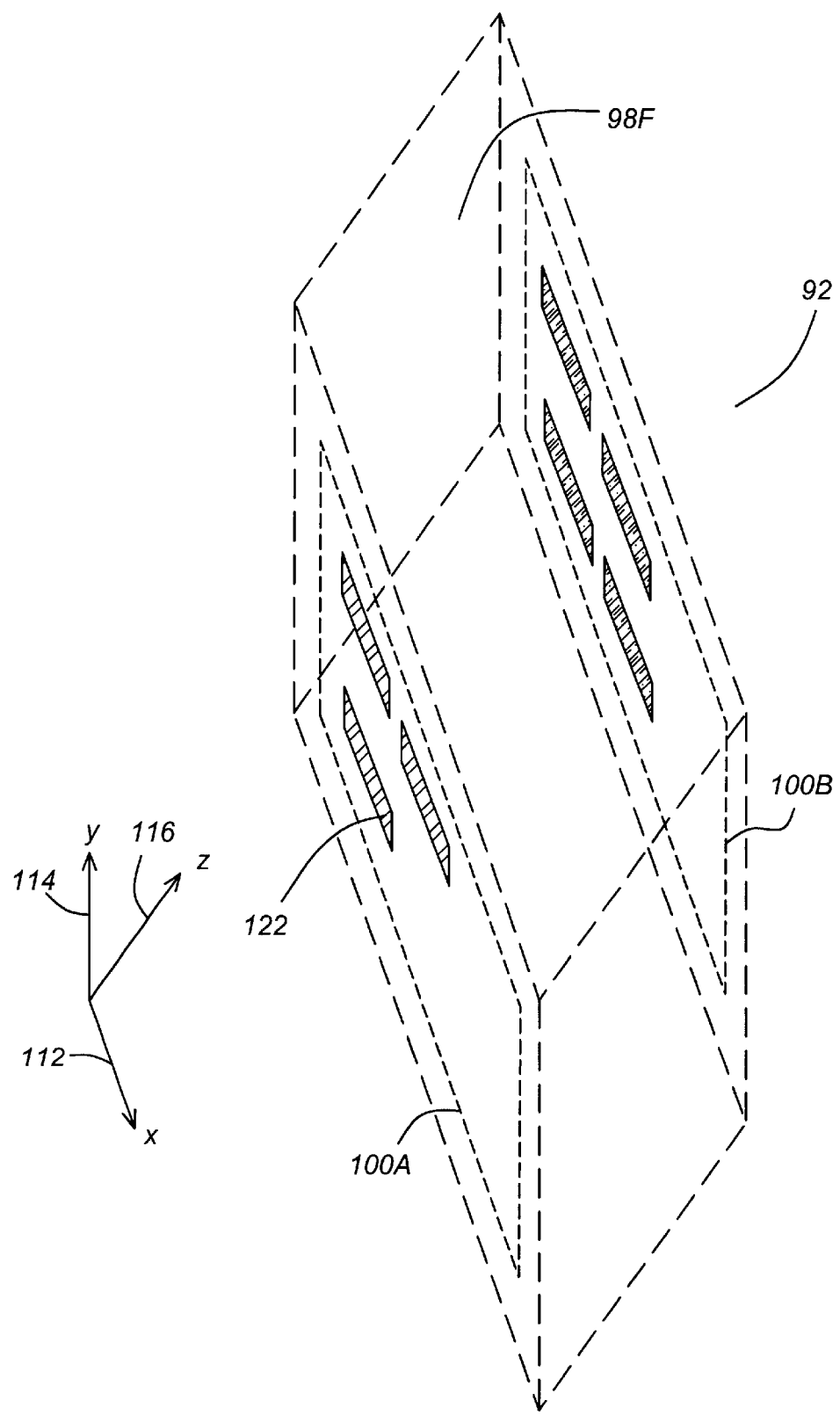
FIG. 8B shows a three dimensional top view of one group of program titles shown in FIG. 8A.

To further illustrate the use of spatial separation along the z-axis 116, second region 98F is shown in FIG. 8B. The view in FIG. 8B is taken looking down into second region 98F. All program titles 94 associated with the second-level organizational category 92 "News" are spatially adjacent to one another in the three dimensional second region 98F. These program titles 94 use a third-level time based organizational category 92. This third-level organization is shown by the spatial separation of the third regions 100A–100B, along the z-axis 116. Although this embodiment shows only two third regions 100A–100B, it is possible that additional "layers" of third regions 100 could exist.

For example, the third-level organization could consist of 9:00 p.m., 10:00 p.m., and 11:00 p.m. Program titles 94 shown at 9:00 p.m. would be in an x-y plane (formed by the x-axis 112 and y-axis 114) proximate to the screen along the z-axis 116. Program titles 94 shown at 10:00 p.m. would be positioned in an x-y plane layered behind the 9:00 p.m. program titles 94. Finally, the program titles 94 shown at 11:00 p.m. would be positioned on an x-y plane layered the farthest into the display along the z-axis 116.

The organizational categories 92 shown in FIGS. 4–8 are included in the program guide data transmitted to the receiving station 34. Each organizational category 92 can be used at any organizational level in any of the embodiments of the electronic program guide 90. Additionally, organizational categories 92 based on the same general concept can be used at different organizational levels. To illustrate, time-based categories may be used in the first region 96 of the electronic program guide 90 (i.e. "What's on this hour"), giving the overall organization of program titles 94. Alternatively, it may be used as the second-level organization by which program titles 94 are further organized. For example, using the organizational category 92 based on the topical subject "Dramas" as the overall organization, time may be used for the second-level organization. The time based categories could be used to separate dramas which start at 7:00 p.m. from dramas which start at 8:00 p.m.

Just as the manner in which the broad organizational category of topical subjects covers organizational categories 92 including "drama", "action" and "comedy", the broad organizational category "time" covers organizational categories including "week", "day", "morning", "afternoon", and "hour." Thus, a time based organizational category can be used at different organizational levels. The overall organization can be what is playing on a specific day and the second-level organization can be what is playing each hour. Alternatively, the overall organization can be what is playing at a specific hour, with a second-level organization of what is playing on a series of days at that hour.

Typically, multiple organizational categories 92 used in organizational regions on the same level (i.e. all first regions 98) will be based on a single theme, such as time or topical subject or actor or channel. For example, for second-level organization shown in second regions 98, organizational categories 92 including "Drama", "Action", "Comedy" and "News" are used. All of these categories are topical subject based. It is not intuitive to create a level of organization which uses the organizational categories 92 "Drama", "Action", "Comedy" and "7:00 p.m." (i.e. three topical based categories and one time based category). By using organizational categories which are based on time, channel, actor, or topical subject, the invention is able to communicate programming information in an effective, intuitive manner.

The electronic program guide 90 is supplied with user-links 122. In FIG. 8B the user-link 122 is indicated as a program title 94. However, user-links 122 can include organizational categories 92 or program titles 94. A user-link 122 may be selected by navigating around the electronic program guide 90 using remote control 86. The viewer uses remote control 86 to direct some type of pointer or indicator around the electronic program guide 90. Although the user-link 122 shown in FIG. 8B is a block of text, any information displayed in the electronic program guide 90 (including pictures and icons) can constitute a user-link.

One purpose of user-links 122 is to give the user the option of requesting additional information about the organizational categories 92 or program titles 94 displayed in the electronic program guide 90. For example, when the viewer selects user-link 122 in FIG. 8B, which refers to a program title 94, the receiver 64 displays text that includes more plot information and a list of actors in the selected program, as well as other information the user may be interested in. Other information may include the time of transmission and the channel of transmission of the program title 94. Alternatively, user-link may cause the receiver 64 to tune directly to a channel which contains the television programming associated with the program title 94. For example, if the user-link 122 selected refers to a program title which is currently being transmitted, the receiver may tune directly to the program content (or alternatively a choice may be offered to the user to either receive more information regarding the program title 94 selected, or tune to the program content).

Typically, user-links 122 are of two basic types, although other types can be added. Information style user-links 122 cause the receiver to link one of two basic types of information. The first destination for the information style user-link 122 is to program objects stored in memory. Program objects, channel objects, boot event objects, HTML objects and their descriptors may be accessed by user-links 122. These user-links 122 access information stored in receiver 64 (shown in FIG. 3). The user selects user-link 122 using remote control 86. As described previously, a signal indicating an information request is received by IR receiver 84 and transmitted to logic circuit 80. Logic circuit 80 informs CPU 74 of the request. In response to the request, CPU 74 causes memory 78 to transfer the object specified by the user-link to the D/A converter 72, which then transmits the object or descriptor to be displayed on television 66.

An example of this type of user-link 122 is shown in FIG. 8B. The user-link 122 points to information in memory 78 about the identified program title, including information about the actors starring in the program, the time of transmission, the channel and a plot synopsis. This information can be identified through the name system discussed previously. After searching memory 78, the receiver 64 displays any information that matches the program title 92. After identifying and displaying the information associated with the program title 92, the receiver may display user-links to other program objects associated with the program titles 94. This can include information on roles played by the starring actors and other program titles 98 with which they are associated.

Command style user-links are the second main type of user-links 122. These links cause something to happen other than the transferal of program guide information. For example, the user is able to instruct the receiver 64 (see FIG. 3) to tune to the correct channel of transmission, to activate a recording device 68, or to allow the user to place a reminder of an upcoming program. If a user selects automatic recording for an entry, receiver 64 instructs recording device 68 to start recording the desired program at the start of the program, and causes recording device 68 to end recording when the desired program is over. If a reminder is set, the receiver 64 would indicate to the user when the selected upcoming television program was being transmitted. Although these user-links 122 can be displayed as part of the invention categorical electronic program guide 90, the command style user-link can also be listed as choices in an operating menu 124 (shown in FIG. 9). The operating menu 124 is displayed by selecting a "menu" button on remote control 86.

Figure 9:
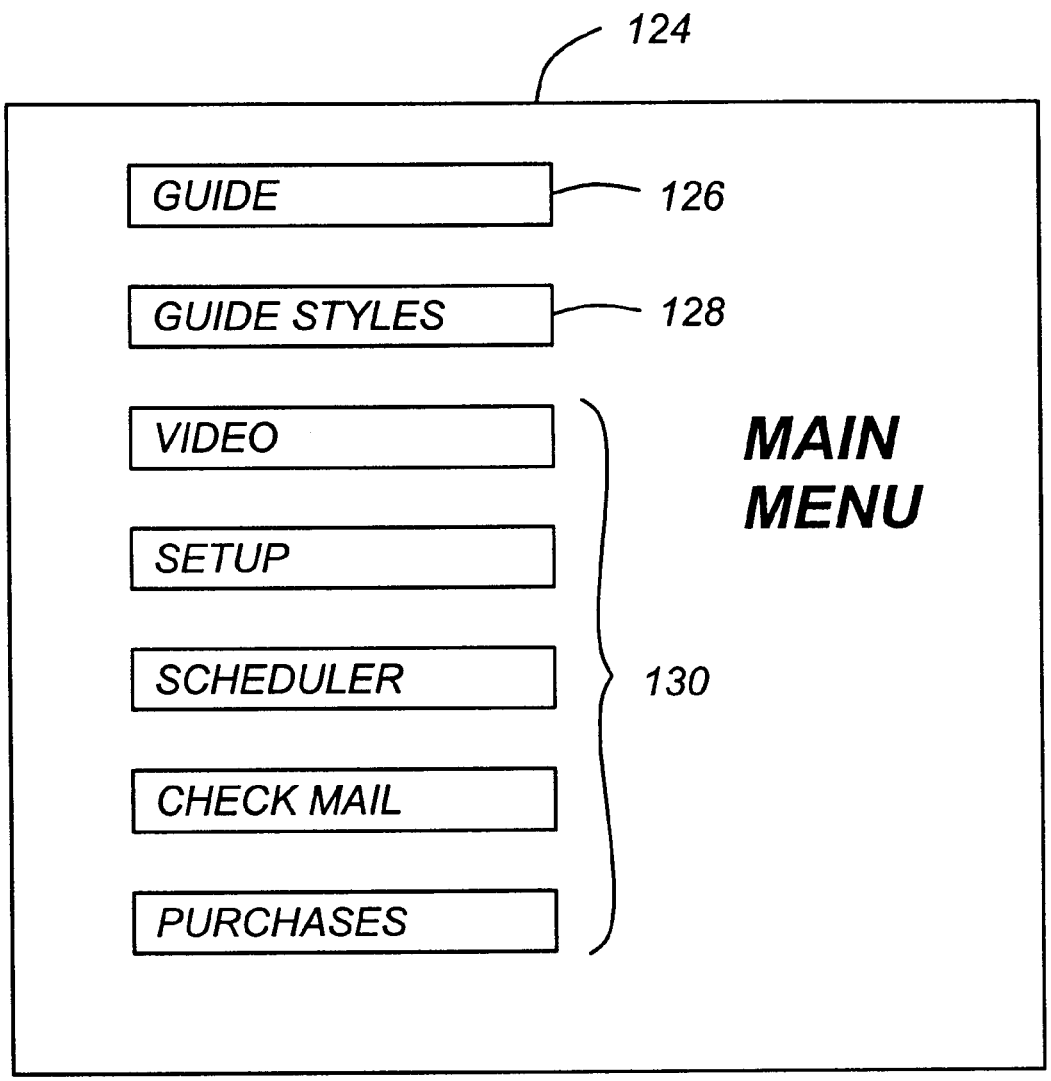
FIG. 9 depicts a display showing an operating menu in accordance with an embodiment of the present invention.

An example of an operating menu 124 is shown in FIG. 9. The operating menu 124 is generated by the receiver 64 and does not rely on program guide data to be generated. The display is "hard wired" into the receiver 64, meaning a digital image of menu 124 is stored in memory 78.

The operating menu 124 shown in FIG. 9 includes a guide link 126, a guide styles link 128, and a list of feature links 130. The feature links 130 allow the user to perform an action which is not directly related to the information in the electronic program guide 90. For example, these links preferably allow the user to check electronic mail, purchase items through an electronic catalog, or adjust the color or brightness of the signal to the user's television. These feature links 130 therefore are not directly related to scheduling information or the electronic program guide 90.

Although command style user-links may be used to allow the user to select various options such as tuning to a particular television program, directing the receiver 64 to record a program, and setting a reminder (as discussed), alternate methods can exist to choose these options. Buttons may exist on remote control 86 which allow the user to directly request these options. Once the user has highlighted a program title 98, he or she may simply press the option button which performs the desired function (i.e. "record this program" or "set reminder"). Other methods can exist to accomplish this task.

The guide link 126 allows the user to request the receiver 64 to display the electronic program guide 90. For example, the receiver 64 could display the operating menu 124 when the user pressed the "menu" button on remote control 86. The user could then select the guide link 126 from the operating menu 124 in order to display the electronic program guide 90. This manner of requesting the receiver 64 to display the electronic program guide is by no means the only way to accomplish this task. For example, the remote control 86 can also contain a "guide" button which, when selected, displays the electronic program guide 90. Other methods may also be used to accomplish this task.

Figure 10:
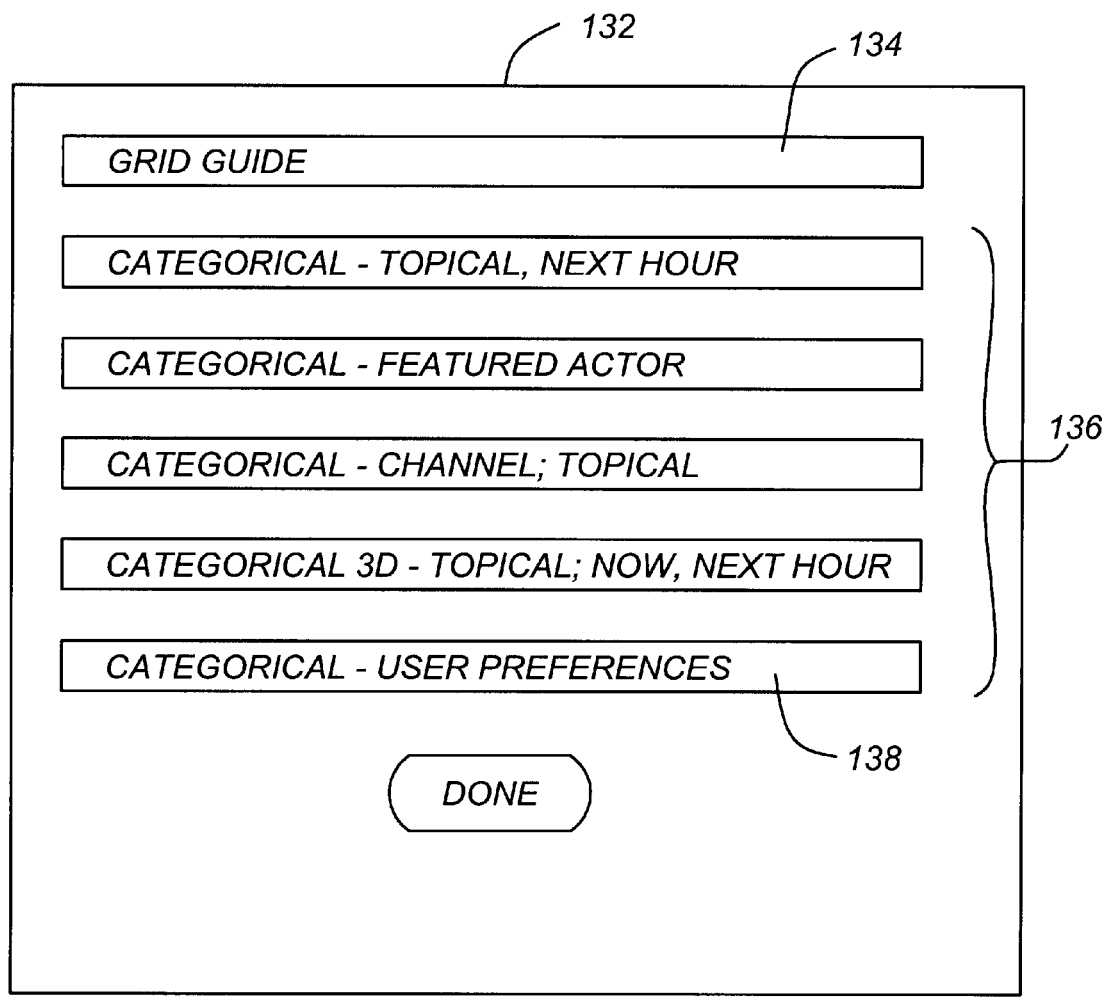
FIG. 10 depicts an operating submenu in accordance with an embodiment of the present invention.

The guide styles link 128 allows the user to select the electronic program guide 90 embodiment which he or she prefers. An example of a sub-menu 132 generated after a user selects the guide styles link 128 is shown in FIG. 10. The sub-menu 132 is generated by receiver 64. Similar to the operating menu 124, the sub-menu 132 is generated by receiver 64 using a digital image stored in memory 78. The digital image for the sub-menu 132 contains blank areas where titles to different program guide embodiments can be inserted. These titles are contained in the program guide data transmitted to receiver 64. The program guide titles are inserted into the blank areas as guide-links. The sub-menu 132 includes a grid guide link 134 and categorical program guide links 136. Selecting one of the guide-links 134 and 136 allows the user to choose the style of electronic program guide 90 that he or she wishes to view. Choosing the grid guide-link 134 would display the prior art program guide utilizing a grid format with program titles placed in "cells." Choosing one of the categorical program guide links 136 would display an embodiment of the invention categorical electronic program guide 90 described above and illustrated in FIGS. 4–8. A "user preferences" link 138 can be included to allow a user the option of choosing organizational categories which suit his or her preferences. After choosing the organizational categories this user defined version of the invention categorical electronic program guide 90 may be saved in memory 78 and recalled at a later time.

Figure 11:
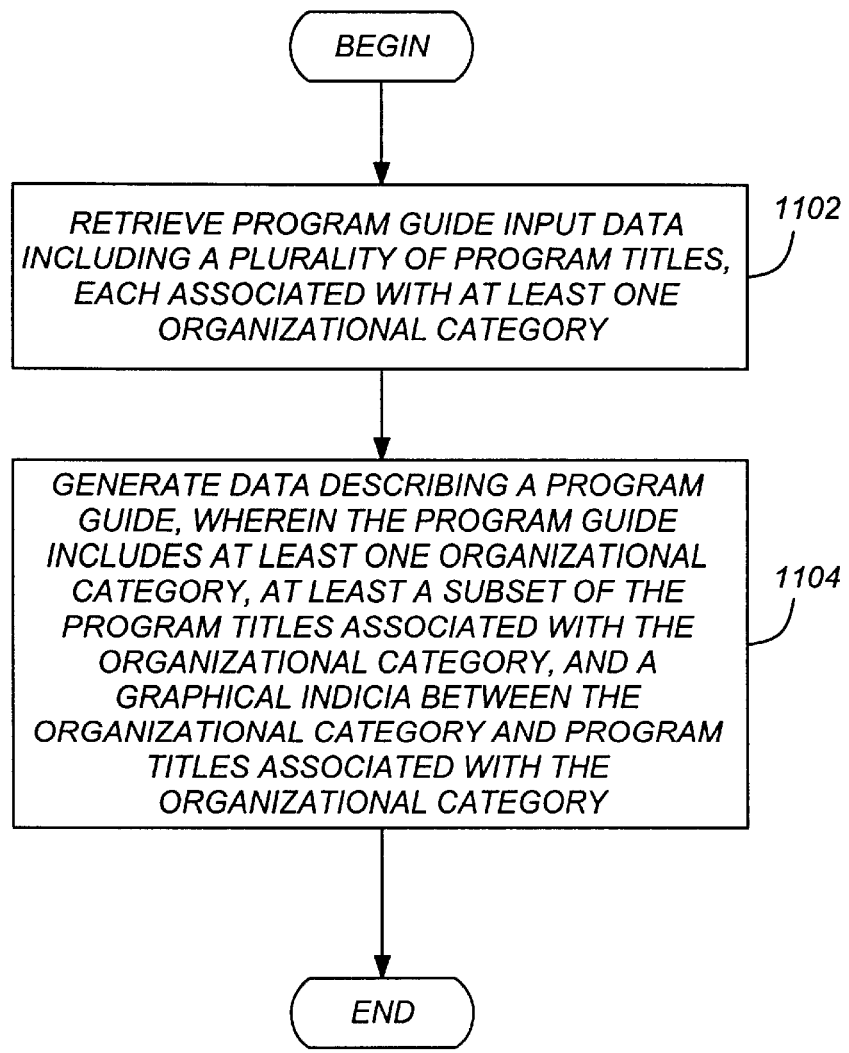
FIG. 11 is a diagram presenting a flow chart of exemplary method steps used in practicing one embodiment of the present invention.

FIG. 11 is a flow chart presenting exemplary process steps used to practice one embodiment of the present invention. Program guide input data is retrieved, as shown in block 1102. The program guide input data includes a plurality of program titles, each program title being associated with one or more organizational categories. Next, as shown in block 1104, data describing the program guide is generated. The program guide includes at least one organizational category, at least a subset of the program titles associated with the organizational category, and a graphical indicia between the organizational category and the program titles associated with the organizational category. In one embodiment, the program guide includes a hierarchical arrangement of at least a portion (e.g. two or more) of the organizational categories including a lowest level organizational category, and the graphical indicia includes an indication of an association between the lowest level organizational category and the program titles associated with the lowest level organizational category. This hierarchical arrangement of organizational categories can be user-controllable, with the user defining which of the organizational categories are displayed, and the hierarchical order of the categories. For example, FIGS. 4 and 5 depict a program guide in which the organizational categories include "what's on" (the highest-level organizational category), and the "Mysteries," "News," "Sports," "Movies," "Comedy," and "Other" categories, which are second-level categories, and "Now," "Next Hour," and "In-Progress" categories which are third level (and in this example, lowest-level) categories. Program titles are presented with a graphical indicia such as the lines between the lowest-level categories and the program titles. Further, FIG. 6 presents a different hierarchical arrangement in which the actor category (in the example, "Gene Hackman") is the highest level organizational category, and the second level categories are "Drama," "Comedies," and "Action." Lowest-level categories include "This week," and "This month," and program titles are associated with the lowest level categories by a graphical indicia. In the illustrated embodiment, the graphical indicia includes both lines extending from the lowest level hierarchical category to the member program titles, as well as a the proximity and position of the program titles to the hierarchical categories. Similarly, FIG. 7 presents yet another hierarchical arrangement in which the highest level organizational category is "What's On," the second level organizational categories describe the channel (e.g. "Channel 5," "Channel 7," "Channel 9," "Channel 11,") and the third level organizational categories describe the program type (e.g. "Drama" and "Mystery." Graphical indicia, including lines extending from the lowest level hierarchical category to the member program titles is also presented. FIG. 8A illustrates a three dimensional presentation of the hierarchical arrangement.

Figure 12A:
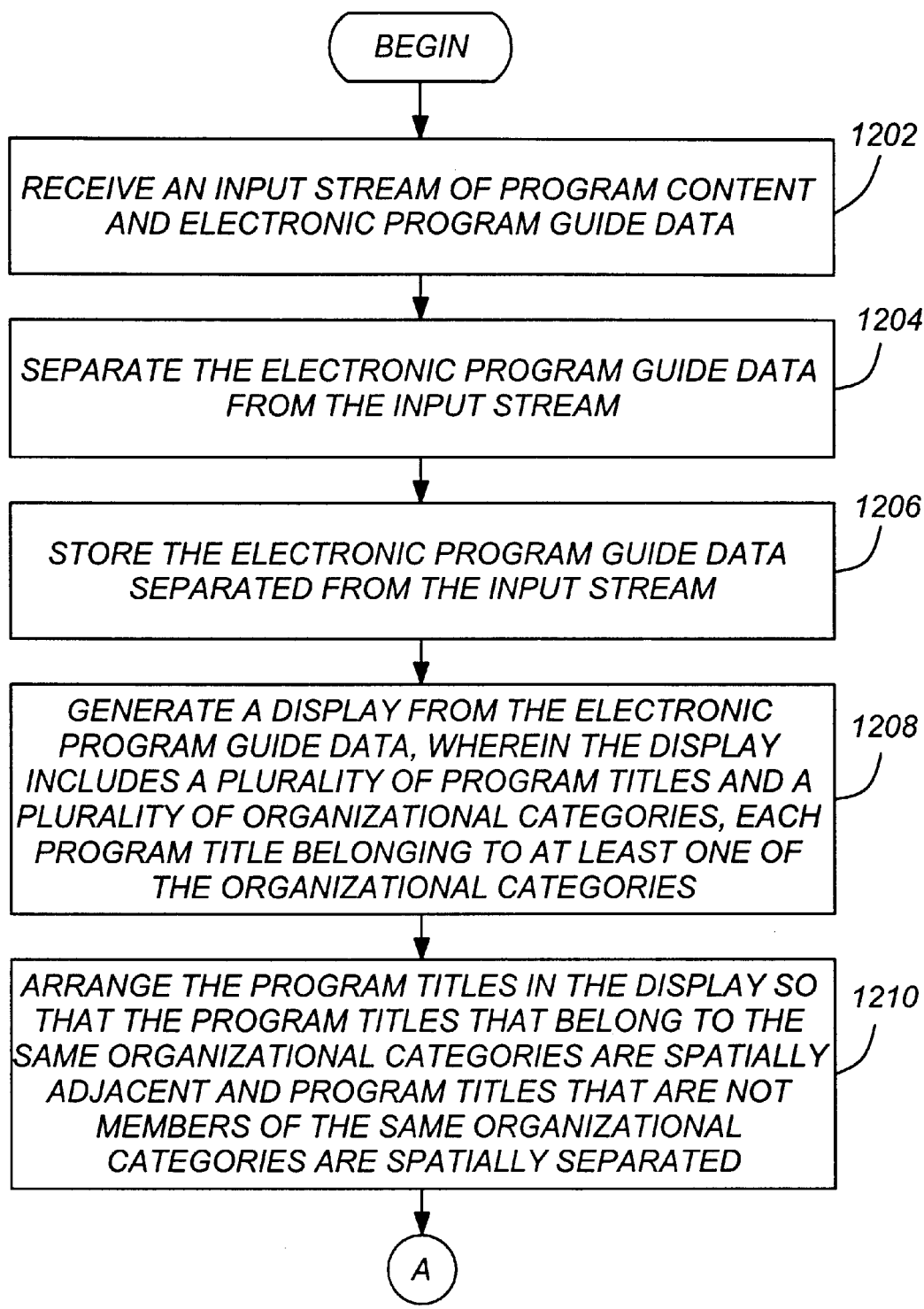
FIGS. 12A and 12B are diagrams presenting a flow chart exemplary method steps used in practicing another embodiment of the present invention.
Figure 12B:
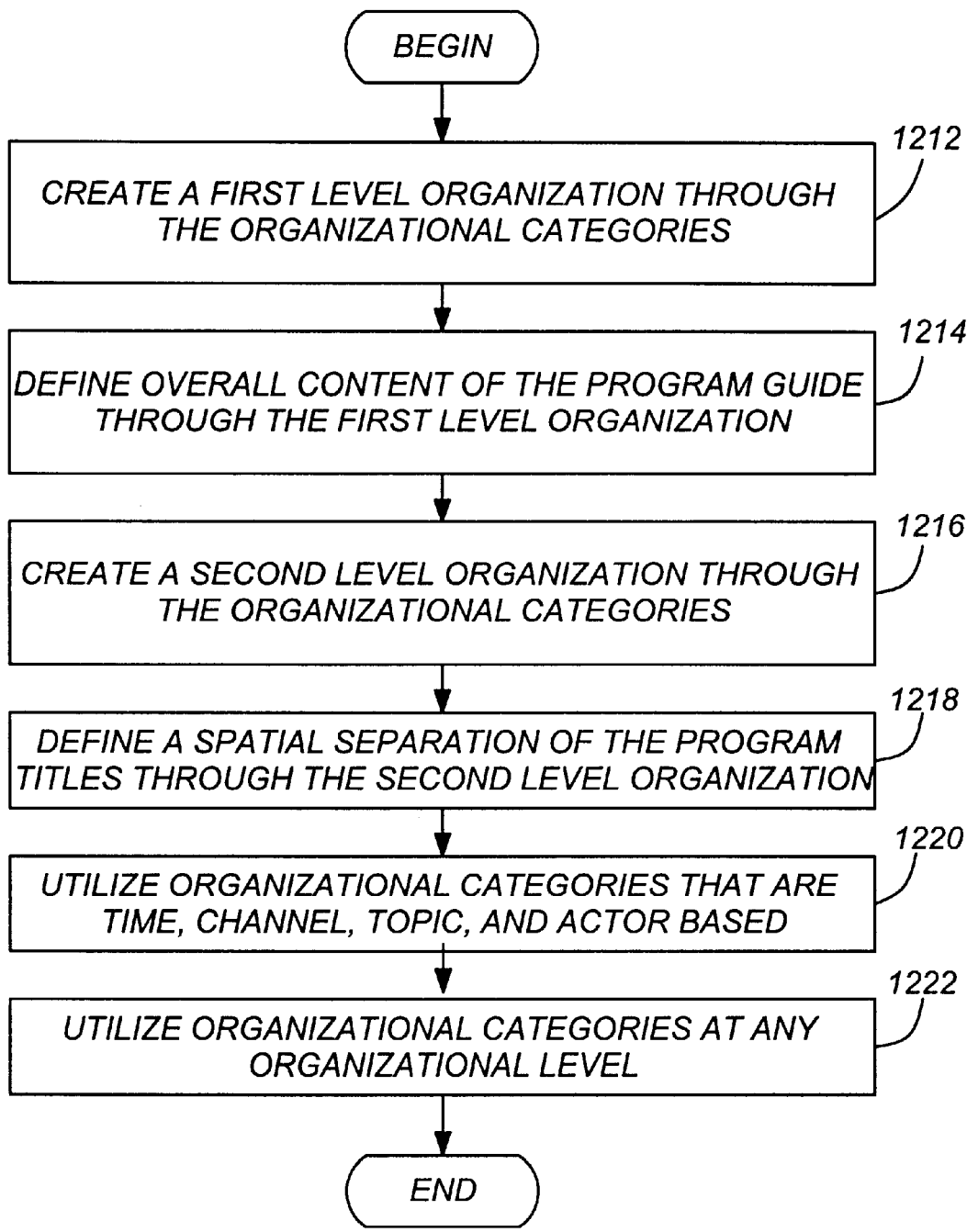

FIGS. 12A–12B are flowcharts presenting illustrative method steps used to practice another embodiment of the present invention. An input stream of program content and electronic program guide data is received, as shown in block 1202. The electronic program guide data is then separated from the input stream and stored, as shown in blocks 1204 and 1206. A display is then generated from the electronic program guide data, as shown in block 1208. The display includes a plurality of program titles and a plurality of organizational categories, each program title belonging to at least one of the organizational categories. The program titles are arranged in the display so that the program titles that belong to the same organizational categories are spatially adjacent and program titles that are not members of the same organizational categories are spatially separated. This is illustrated in block 1210. A first level organization is created through the organizational categories, as shown in block 1212. The overall content of the program guide is defined through this first level organization, as shown in block 1214. A second level organization is then created through the organizational categories, as shown in block 1216. Then, as shown in block 1218, the program titles are defined having a spatial separation using the second level organization. As shown in blocks 1220 and 1222, the organizational categories may be time, channel, topic, or actor based, and can be arranged at any organizational level.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A device for generating a display of an electronic program guide on a screen, the device comprising:

a receiver including a tuner for receiving an input stream, of television content and electronic program guide data, and separating the electronic program guide data from the input stream;

a memory coupled to the tuner for storing the electronic program guide data separated from the input stream;

display means for generating a display which combines a set of electronic program guide data including a plurality of program titles, and a plurality of organizational categories, each program tide belonging to at least one of the organizational categories, the program tides arranged in the display so that program titles which belong to the same organizational categories are spatially adjacent and program titles which are not members of the same organizational categories are spatially separated, the organizational categories providing a first-level organization which defines overall content of the display and a second-level organization which defines the spatial separation of the program titles, where the organizational categories are time, channel topic and actor based, and are used at any organizational level.

2. The device of claim 1, wherein the organizational categories provide additional levels of organization to the display.

3. The device of claim 1, wherein program titles are displayed in different colors to represent associated organizational categories.

4. The device of claim 1, wherein the organizational categories are represented by icons.

5. The device of claim 1, wherein the display further includes a first user-link, where selecting the link provides instructions to the display means.

6. The device of claim 5, wherein the instructions provided to the display means instruct the display means to display a television program.

7. The device of claim 5, wherein the instructions provided to the display means instruct the display means to display additional textual or graphical electronic program guide data.

8. The device of claim 5, wherein the instructions provided to the display means instruct the display means to display a receiver operating menu.

9. The device of claim 8, wherein the receiver operating menu includes a second user-link which instructs the display means to display the electronic program guide based on the organizational categories.

10. The device of claim 8, further comprising a memory device couple to the receiver for recording selected television content, where the memory device is activated through the selection of a second user-link included in the operating menu.

11. The device of claim 8, further comprising a second user-link included in, the operating menu, wherein a reminder for an upcoming television program is set when the second user-link is selected.

12. The device of claim 1, wherein the program titles are arranged three-dimensionally so that some program titles appear to be displayed more distal from the front of the display behind other program titles displayed more proximal to the front of the display.

13. The device of claim 1, wherein a remote control is used to direct the receiver to perform an operational function, including signaling a recording device to record a specified television program, signaling the tuner to generate a display of a specified television program, and setting a reminder in memory to display the specified television program upon receiving the specified television program in the input stream, the operational function is performed by pressing a button on the remote control.

14. A method of displaying an electronic program guide on a screen, the method comprising:

receiving an input stream of television content and electronic program guide data;

separating the electronic program guide data from the input stream;

storing the electronic program guide data separated from the input stream;

generating a display from the electronic program guide data, wherein the display includes a plurality of program titles, and a plurality of organizational categories, each program title belonging to at least one of the organizational categories;

arranging the program titles in the display so that program titles which belong to the same organizational categories are spatially adjacent and program titles which are not members of the same organizational categories are spatially separated;

creating a first-level organization through the organizational categories;

defining overall content of the program guide through the first-level organization;

creating a second-level organization through the organizational categories;

defining the spatial separation of the program titles through the second-level organization;

utilizing organizational categories which are time, channel, topic, and actor based; and utilizing organizational categories at any organizational level.

15. The method of claim 14, further comprising the steps of:

providing additional levels of organization, spatially separating the program titles; and utilizing organizational categories for the additional levels of organization.

16. The method of claim 14, wherein the program titles utilize different colors to represent the organizational categories.

17. The method of claim 14, wherein the organizational categories are represented by icons.

18. The method of claim 14, further comprising:

receiving a user tuning request selecting a user-link; and responding to the tuning request by displaying the television content associated with the selected user-link.

19. The method of claim 14, further comprising the steps of:

receiving a user request selecting a user-link; and responding to the request by displaying textual or graphical electronic, program guide data associated with the selected user-link.

20. The method of claim 14, further comprising the steps of:

displaying an operating menu; and displaying at least one user-link in the operating menu.

21. The method of claim 20, further comprising the step of activating a recording device.

22. The method of claim 20, further comprising the step of setting a reminder for an upcoming television program.

23. The method of claim 14, wherein the program titles are arranged three-dimensionally so that some program titles appear to be displayed more distally from a front of the display, behind other program titles that appear to be displayed more proximally to the front of the display.

24. The method of claim 14, further comprising the steps of:

requesting the performance of an operational function from a remote control; and performing the operational function by one of the following: signaling a recording device to record a specified television program; generating a display of the specified television program; and setting a reminder to display the specified television program upon transmission of the specified television program.

25. An electronic program guide comprising:

a set of electronic program guide data including a plurality of program titles and a plurality of organizational categories, where each program title belongs to at least one organizational category;

a first spatial arrangement of program titles in a three-dimensional format where one organization level of the electronic program guide spatially groups program titles which belong to the same organizational category in three-dimensional space; and spatially separates program titles which do not belong to the same organizational category in three-dimensional space;

a second spatial arrangement of program titles in two-dimensional space, where a second organizational level of the electronic program guide spatially groups program titles which belong to the same organizational category in the same two dimensional plane, and spatially separates program titles which do not belong to the same organizational category in a different two-dimensional plane.

* * * * *